United States Patent
Capots et al.

(10) Patent No.: US 6,934,609 B2
(45) Date of Patent: Aug. 23, 2005

(54) SPACE-BASED INTEGRATED MULTI-MISSION BROADBAND ARCHITECTURE

(75) Inventors: Larry H. Capots, Mountain View, CA (US); William C. Lynch, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 101 days.

(21) Appl. No.: 10/618,314

(22) Filed: Jul. 10, 2003

(65) Prior Publication Data

US 2004/0093132 A1 May 13, 2004

Related U.S. Application Data

(63) Continuation-in-part of application No. 09/707,967, filed on Nov. 8, 2000, now abandoned.

(51) Int. Cl.[7] ............................................. H04Q 7/00
(52) U.S. Cl. ..................... 701/13; 701/226; 455/13.1; 455/427
(58) Field of Search ................... 701/13, 226; 455/13.1, 455/427, 428, 429, 430; 424/164, 158 R; 342/352; 370/230, 235, 253

(56) References Cited

U.S. PATENT DOCUMENTS

| | | |
|---|---|---|
| 4,654,846 A | 3/1987 | Goodwin et al. |
| 5,940,739 A | 8/1999 | Conrad et al. |
| 6,002,916 A * | 12/1999 | Lynch ........................ 455/13.1 |
| 6,032,041 A * | 2/2000 | Wainfan et al. ............. 455/427 |
| 6,257,526 B1 * | 7/2001 | Taormina et al. ........ 244/158 R |
| 6,339,707 B1 * | 1/2002 | Wainfan et al. ............. 455/427 |
| 6,654,344 B1 * | 11/2003 | Toporek et al. ............. 370/230 |

FOREIGN PATENT DOCUMENTS

| | | |
|---|---|---|
| EP | 0 881 553 A1 | 12/1998 |
| EP | 0 884 860 A2 | 12/1998 |
| WO | WO 99/22529 | 5/1999 |
| WO | WO 99/63680 | 12/1999 |

* cited by examiner

*Primary Examiner*—Thomas G. Black
*Assistant Examiner*—Arthur D. Donnelly
(74) *Attorney, Agent, or Firm*—McDermott Will & Emery LLP

(57) ABSTRACT

Spacecraft network and communication method thereof. A spacecraft network includes a first server spacecraft disposed in a first server orbit, a first client spacecraft disposed in a first client orbit, and a wireless local area network formed between at least the first server spacecraft and the first client spacecraft. The wireless local area network includes at least one communication channel to transmit and receive spatial information, at least one receiver to receive a first communication signal including at least routing information, at least one routing system to determine a desired route, and one transmitter to transmit the first communication signal. The first client spacecraft is free from the at least one routing system, and the first server spacecraft includes one of the at least one routing system.

45 Claims, 18 Drawing Sheets

1280 ⟶

| Routes | Spacecrafts | Route Information |
|---|---|---|
| 1 | 1170→1172 | Information for route 1 |
| 2 | 1170→1174→1178→1176→1172 | Information for route 2 |
| 3 | 1170→1174→1172 | Information for route 3 |
| 4 | 1170→1178→1174→1172 | Information for route 4 |
| ⋮ | ⋮ | ⋮ |

| Routes | WAN Spacecrafts | Route Information |
|---|---|---|
| 1 | 1670→1672 | Information for route 1 |
| 2 | 1670→1674→1678→1676→1672 | Information for route 2 |
| 3 | 1670→1674→1672 | Information for route 3 |
| 4 | 1670→1678→1674→1672 | Information for route 4 |
| ⋮ | ⋮ | ⋮ |

Figure 17

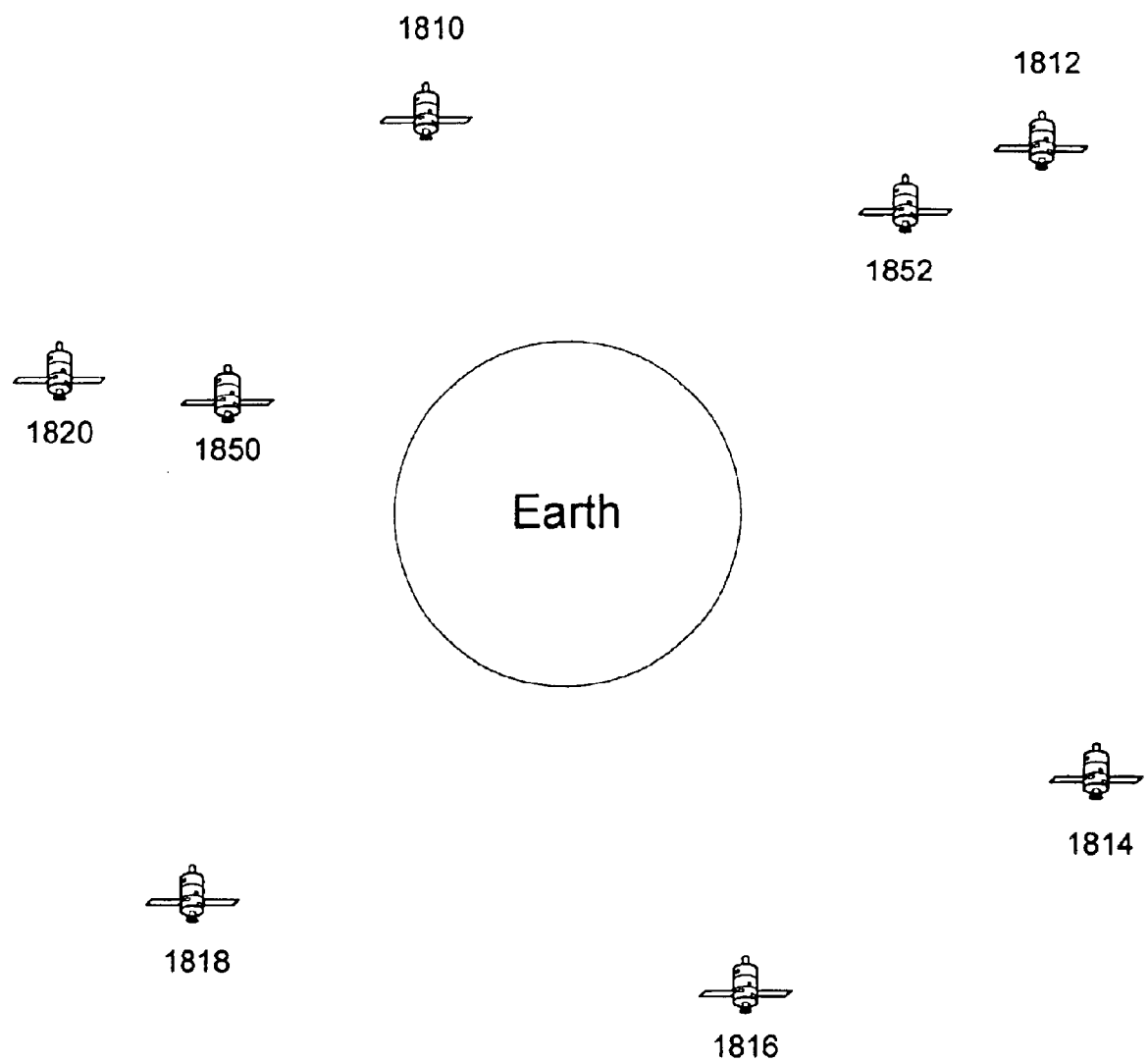

SPACE-BASED INTEGRATED MULTI-MISSION BROADBAND ARCHITECTURE

CROSS-REFERENCES TO RELATED APPLICATIONS

This application is a continuation-in-part application and claims priority to U.S. application Ser. No. 09/707,967 filed Nov. 8, 2000, now abandoned, which is incorporated by reference herein.

BACKGROUND OF THE INVENTION

The present invention relates to a server satellite, a space-based network, and a method and computer program product for operation thereof that manage communications traffic with a client spacecraft and a ground terminal.

As the number of satellites in orbit increases, so has the cost of operating and controlling these satellites. While some of the increased cost is due simply to increased numbers of satellites, a significant portion of the increased cost is due to incompatibility among various networks of satellites. For example, satellite control operations are performed by organizations such as the Air Force Satellite Control Network, the Navy Satellite Control Network, the Naval Research laboratory Satellite Control Network, the Army Satellite Control Network, the NASA Space Satellite Control Network, and the civil communities NOAA Satellite Control Network. None of these satellite control networks are compatible with one another. There is also significant redundancy and overlap of satellite control operations among networks. This drives excess mission costs for the ground control segments of the various different satellite networks, especially in view of the fact that each network is supported by multiple ground control sites.

While the cost of operation of existing satellite networks is one issue, additional issues are the cost and complexity of adding new satellite platforms to existing networks. In particular, one satellite platform cannot be used in all satellite networks, due to the incompatibility among networks. Instead, a different satellite platform must be constructed for operation in each network.

A need arises for a scheme by which various satellite control networks may be made compatible with one another, reducing redundancy and overlap of satellite control operations and thus, the cost of such operations. Likewise, such compatibility would reduce the cost and complexity of introducing new satellite platforms into various satellite networks.

BRIEF SUMMARY OF THE INVENTION

The present invention is a server satellite, a space-based network, and a method and computer program product for operation thereof, which provides compatibility among satellite platforms and networks. The present invention provides compatibility among satellite networks, reducing redundancy and overlap of satellite control operations and thus, the cost of such operations and reducing the cost and complexity of introducing new satellite platforms into various satellite networks.

A server satellite, according to the present invention, comprises a satellite platform and a server system operable to manage communications traffic with a client spacecraft and a ground terminal, the client spacecraft and the ground terminal communicatively connected to the server system. The ground terminal may be communicatively connected to a ground-based network, which may be the Internet.

The server system may be operable to manage communications traffic between a local network of client spacecraft and the ground terminal. The server system may be operable to manage communications traffic by routing communications traffic between the client spacecraft and the ground terminal. The local network of client spacecraft may comprise client spacecraft that are substantially similar. The client spacecraft that are substantially similar may be capable of performing substantially similar missions. The local network of client spacecraft may comprise a client spacecraft that is different than another client spacecraft. The client spacecraft that are different may be capable of performing different missions.

The server system may be further operable to route communications traffic among the client spacecraft independently of the ground terminal. The local network of client spacecraft may comprise client spacecraft that are substantially similar. The client spacecraft that are substantially similar may be capable of performing substantially similar missions. The local network of client spacecraft may comprise a client spacecraft that is different than another client spacecraft. The client spacecraft that are different may be capable of performing different missions.

The server system may be operable to manage communications traffic between a remote network of client spacecraft and the ground terminal. The server system may be operable to manage communications traffic by routing communications traffic between the client spacecraft and the ground terminal. The remote network of client spacecraft may comprise client spacecraft that are substantially similar. The client spacecraft that are substantially similar may be capable of performing substantially similar missions. The remote network of client spacecraft may comprise a client spacecraft that is different than another client spacecraft. The client spacecraft that are different may be capable of performing different missions.

The server system may be further operable to route communications traffic among the client spacecraft independently of the ground terminal. The remote network of client spacecraft may comprise client spacecraft that are substantially similar. The client spacecraft that are substantially similar may be capable of performing substantially similar missions. The remote network of client spacecraft may comprise a client spacecraft that is different than another client spacecraft. The client spacecraft that are different may be capable of performing different missions.

The server system may comprise driver software operable to control the client spacecraft. The driver software may be operable to control communications with and the acquisition of data from the client spacecraft. The server system may further comprise application software operable to perform processing on data received from a client spacecraft or data to be transmitted to a client spacecraft. The server system may comprise application software operable to perform processing on data received from a client spacecraft or data to be transmitted to a client spacecraft. The server system may be operable to receive driver software operable to control the client spacecraft, application software operable to perform processing on data received from a client spacecraft or data to be transmitted to a client spacecraft, or both driver software and application software, from the client spacecraft.

A method, according to the present invention, of managing communications traffic with a client spacecraft and the ground terminal is performed in a server satellite comprising a satellite platform, and a server system, the server system communicatively connected to a ground terminal. The method comprises the steps of: establishing a communicative connection with the client spacecraft; receiving information identifying the client spacecraft; determining whether software necessary to support a mission of the client spacecraft is present; receiving the software necessary to support the mission of the client spacecraft from the client spacecraft, if the software necessary to support the mission of the client spacecraft is not present; and managing communications traffic between the client spacecraft and the ground terminal using the software necessary to support the mission of the client spacecraft. The ground terminal may be communicatively connected to a ground-based network, which may be the Internet.

There may be a plurality of client spacecraft forming a local area network and the step of managing communications traffic between the client spacecraft and the ground terminal may comprise the step of managing communications traffic between the local network and the ground terminal. The step of managing communications traffic between the local network and the ground terminal may comprise the step of routing communications traffic between the client spacecraft and the ground terminal. The local network of client spacecraft may comprise client spacecraft that are substantially similar. The client spacecraft that are substantially similar may be capable of performing substantially similar missions. The local network of client spacecraft may comprise a client spacecraft that is different than another client spacecraft. The client spacecraft that are different are capable of performing different missions.

The method may further comprise the step of routing communications traffic among the client spacecraft independently of the ground terminal. The local network of client spacecraft may comprise client spacecraft that are substantially similar. The client spacecraft that are substantially similar may be capable of performing substantially similar missions. The local network of client spacecraft may comprise a client spacecraft that is different than another client spacecraft. The client spacecraft that are different are capable of performing different missions.

There may be a plurality of client spacecraft forming a remote network and the step of managing communications traffic between the client spacecraft and the ground terminal may comprise the step of managing communications traffic between the remote network and the ground terminal. The step of managing communications traffic between the remote network and the ground terminal comprises the step of routing communications traffic between the client spacecraft and the ground terminal. The remote network of client spacecraft may comprise client spacecraft that are substantially similar. The client spacecraft that are substantially similar may be capable of performing substantially similar missions. The remote network of client spacecraft may comprise a client spacecraft that is different than another client spacecraft. The client spacecraft that are different may be capable of performing different missions.

The method may further comprise the step of routing communications traffic among the client spacecraft independently of the ground terminal. The remote network of client spacecraft may comprise client spacecraft that are substantially similar. The client spacecraft that are substantially similar may be capable of performing substantially similar missions. The remote network of client spacecraft may comprise a client spacecraft that is different than another client spacecraft. The client spacecraft that are different may be capable of performing different missions.

The method may further comprise the step of controlling communications with and the acquisition of data from the client spacecraft using the software necessary to support the mission of the client spacecraft. The method may further comprise the step of processing on data received from a client spacecraft or data to be transmitted to a client spacecraft using application software included in the software necessary to support the mission of the client spacecraft. The method may further comprise the step of processing on data received from a client spacecraft or data to be transmitted to a client spacecraft using application software included in the software necessary to support the mission of the client spacecraft.

According to another embodiment of the present invention, a spacecraft network includes a first server spacecraft disposed in a first server orbit, a first client spacecraft disposed in a first client orbit, and a wireless local area network formed between at least the first server spacecraft and the first client spacecraft. The wireless local area network includes at least one communication channel to transmit and receive spatial information between at least the first server spacecraft and the first client spacecraft. The spatial information indicates at lease a first server position and a first server orientation of the first server spacecraft and a first client position and a first client orientation of the first client spacecraft. Additionally the wireless local network includes at least one receiver to receive a first communication signal including at least routing information. The routing information includes at least a destination spacecraft as a destination of the first communication signal. Moreover, the wireless local network includes at least one routing system to determine a desired route from a plurality of routes to transmit the first communication signal to the destination spacecraft. Each of the plurality of routes corresponding to a plurality of path spacecrafts. Also, the wireless network includes at least one transmitter to transmit the first communication signal based upon the desired route and the spatial information of the plurality of path spacecrafts of the desired route. The first client spacecraft is free from the at least one routing system, and the first server spacecraft includes one of the at least one routing system.

According to yet another embodiment of the present invention, a spacecraft network includes a first server spacecraft disposed in a first server orbit, a second server spacecraft disposed in a second server orbit, and a wireless wide area network formed between at least the first server spacecraft and the second server spacecraft. The wireless wide area network includes at least one communication channel to transmit and receive spatial information between at least the first server spacecraft and the second server spacecraft. The spatial information indicates at lease a first server position and a first server orientation of the first server spacecraft and a second server position and a second server orientation of the second server spacecraft. Additionally, the wireless wide area network includes at least one receiver to receive a first communication signal including at least routing information at the first server spacecraft. The routing information includes at least a destination spacecraft as a destination of the first communication signal. Moreover, the wireless wide area network includes at least one routing system to determine a desired route from a plurality of routes to transmit the first communication signal from the first server spacecraft to the destination spacecraft. Each of the plurality of routes corresponds to a plurality of path spacecrafts. Also, the wireless wide area network includes at least one transmitter to transmit the first communication signal based upon the desired route and the spatial information of the plurality of path spacecrafts of the desired route. The first server spacecraft includes one of the at least one routing system.

According to yet another embodiment of the present invention, a method for spacecraft communication includes disposing a first server spacecraft in a first server orbit, disposing a first client spacecraft in a first client orbit, and transmitting and receiving spatial information between the first server spacecraft and the first client spacecraft. The spatial information indicates at least a first server position and a first server orientation of the first server spacecraft and a first client position and a first client orientation of the first client spacecraft. Additionally, the method includes receiving an information packet including at least routing information. The routing information includes at least a destination spacecraft as a destination of the information packet. Moreover, the method includes determining a desired route from a plurality of routes to transmit the information packet data to the destination spacecraft based on at least the spatial information of the destination spacecraft. The plurality of routes corresponds to a plurality of paths respectively, and each of the plurality of paths includes a plurality of path spacecrafts. Also, the method includes transmitting the information packet based upon the desired route and the spatial information of the plurality of path spacecrafts of the desired route. The first client spacecraft is free from the at least one routing system, and the first server spacecraft includes one of the at least one routing system.

According to yet another embodiment of the present invention, a method for spacecraft communication includes disposing a first server spacecraft in a first server orbit, disposing a second server spacecraft in a second server orbit, and transmitting and receiving spatial information between the first server spacecraft and the second server spacecraft. The spatial information indicates at least a first server position and a first server orientation of the first server spacecraft and a second server position and a second server orientation of the second server spacecraft. Additionally, the method includes receiving an information packet including at least routing information. The routing information includes at least a destination spacecraft as a destination of the information packet. Moreover, the method includes determining a desired route from a plurality of routes to transmit the information packet data to the destination spacecraft based on at least the spatial information of the destination spacecraft. The plurality of routes corresponds to a plurality of paths respectively, and each of the plurality of paths includes a plurality of path spacecrafts. Also, the method includes transmitting the information packet based upon the desired route and the spatial information of the plurality of path spacecrafts of the desired route. The first server spacecraft includes one of the at least one routing system.

Many benefits may be achieved by way of the present invention over conventional techniques. For example, certain embodiments of the present invention centralize certain functions onto a server spacecraft and delegate certain functions to specialized client spacecrafts. For example, the client spacecrafts may specialize in uplink communications with a ground station, downlink communications with a ground station, altitude control, or other function. As another example, the server spacecraft may provide power to the client spacecrafts over LAN. The client spacecrafts are usually less expensive than a fully-functional spacecraft without the support of the server spacecraft and other client spacecrafts. The client spacecrafts of the present invention are usually easy to replace and can provide backup to other client or server spacecrafts.

Depending upon the embodiment under consideration, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

The details of the present invention, both as to its structure and operation, can best be understood by referring to the accompanying drawings, in which like reference numbers and designations refer to like elements.

FIG. 12 is a simplified diagram of LAN routing database for data processing segment according to one embodiment of the present invention.

FIG. 17 is a simplified diagram of WAN routing database for communications according to one embodiment of the present invention.

FIG. 18 is a simplified WAN and LAN network according to one embodiment of the present invention.

DETAILED DESCRIPTION OF THE INVENTION

Figure 1:
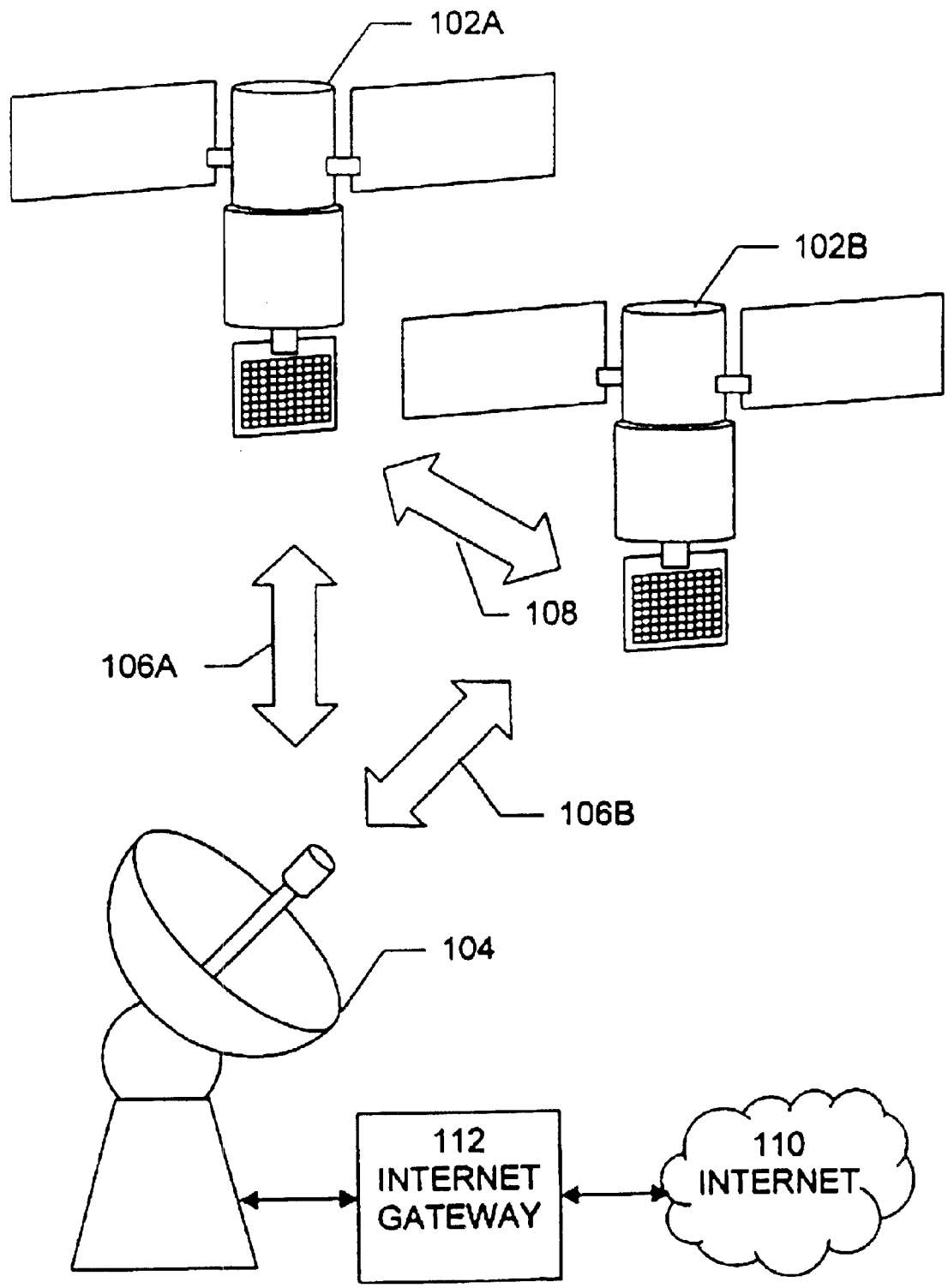
FIG. 1 is an exemplary block diagram of one embodiment of the present invention.

An exemplary embodiment of the present invention is shown in FIG. 1. In this embodiment, one or more server satellites, such as satellites 102A and 102B, are placed in orbit. While the present invention contemplates server satellites in any orbit, in a preferred embodiment, the server satellites are in geosynchronous earth orbit (GEO).

Preferably, each server satellite is in communication with one or more ground terminals. For example, in FIG. 1, server satellite 102A is in communication with ground terminal 104 over communication channel 106A. Likewise, server satellite 102B is in communication with ground terminal 104 over communication channel 106B. Alternatively, server satellites 102A and 102B could be in communication with different ground terminals, or with multiple ground terminals. As another alternative, a server satellite might not be in direct communication with a ground terminal, but might communicate through another server satellite.

The server satellites, if there are more than one, are in communication with each other. For example, server satellites 102A and 102B are in communication with each other over communication channel 108. Communication channels 106A, 106B and 108 typically use ultra-high frequency radio (UHF) frequency (RF) communications. However, other communications media, such as optical communications, or radio frequency communications at frequencies above or below the UHF band may also be used.

An important feature of the present invention is that the server satellites are communicatively connected to the Internet. For example, in FIG. 1, ground terminal 104 receives and transmits data communicated over communications channels 106A and 106B. Ground terminal 104 is connected to the Internet 110 via an Internet gateway system 112. Internet gateway system 112 performs processing of data and protocols. Together, ground terminal 104 and Internet gateway system 112 provide the communications and processing necessary to provide communicative connection of server satellites 102A and 102B to the Internet 110.

Figure 2:
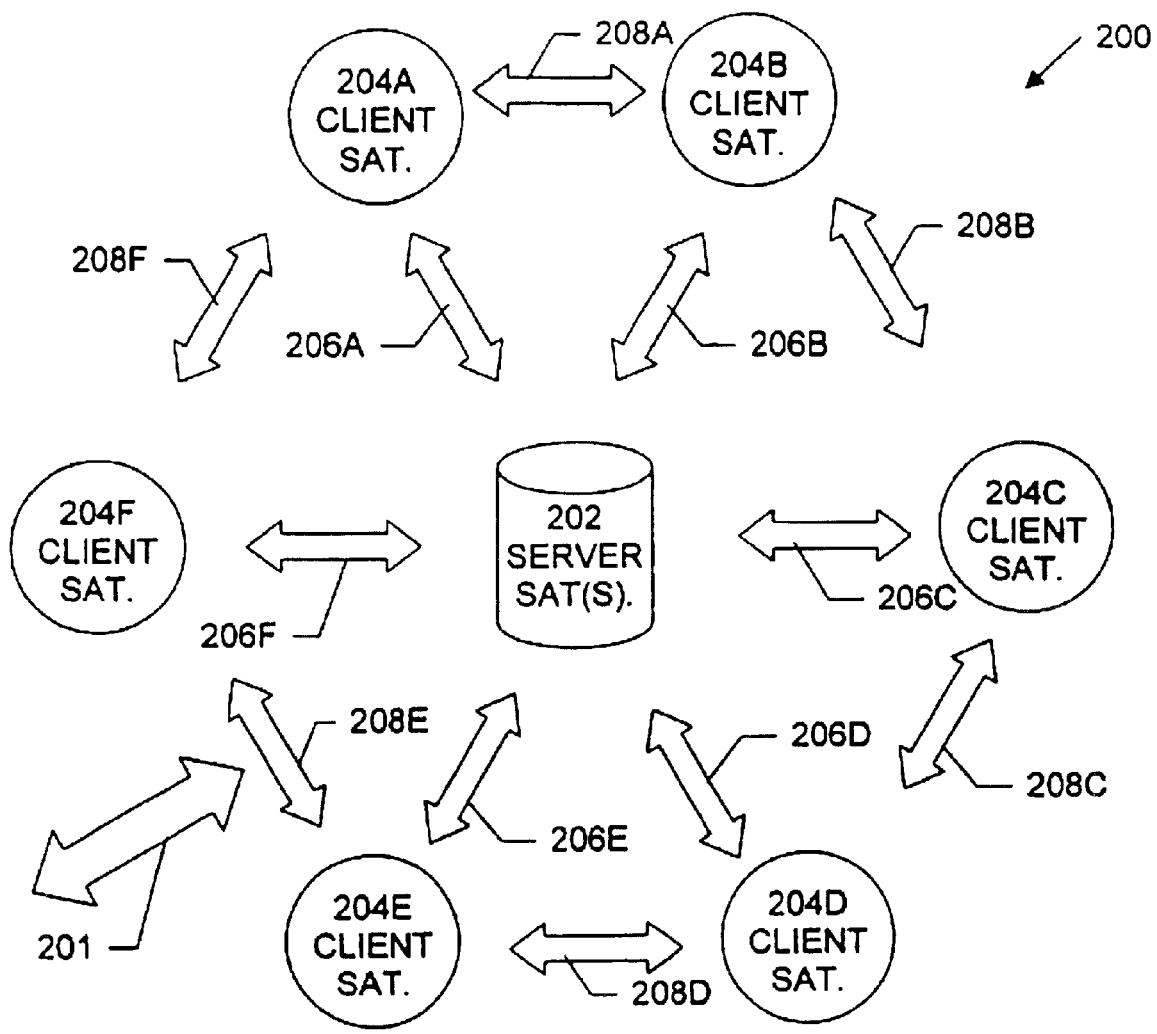
FIG. 2 is an exemplary block diagram of another embodiment of the present invention.

An exemplary local space-based network 200 is shown in FIG. 2. Server satellite (or satellites) 202 is in communication with one or more ground terminals over communications channel 201, in an arrangement similar to that shown in FIG. 1. Likewise, as shown in FIG. 1, the ground terminals are connected to the Internet. Server satellite 202 is also in communication with one or more client spacecraft, such as client spacecraft 204A–204F, over communication channels such as communication channels 206A–206F. Client spacecraft 204A–204F may also be in communication with each other over communication channels such as channels 208A–208F. The communication channels shown in FIG. 2 are exemplary only, not all possible communication channels' are shown. The present invention, however, contemplates any and all possible communication channels, such as client to client, client to server, server to server, and server to ground communication channels.

Server satellites are spacecraft, typically in Earth orbit, that manage space-based communication networks that include server satellites, client spacecraft, and ground terminals. Communications traffic between the ground and the network of client spacecraft are routed through and managed by, the server satellites. Likewise, the server satellites may route and manage communication traffic among the client spacecraft in the network. This routing and management may be performed independently of the ground terminal. Server satellites are typically based on standard communications satellite platforms, adapted to accept and operate a network server system that actually performs the network traffic management and routing.

Client spacecraft are spacecraft that perform particular missions, such as communications, meteorological missions, imaging, navigation, or other missions. Preferably, client spacecraft communicate with users on Earth via server satellite 202 and the server satellite to ground terminal communication channel 201. For example, client spacecraft 204A communicates with server satellite 202 over communication channel 206A. Preferably, the communications between client spacecraft and the server satellite are networked communications. Thus, together, server satellite 202 and client spacecraft 204A–204F form a local space-based network.

Preferably, the network protocols used for communications between the server satellite and the client spacecraft is a standard Internet protocol, such as Transmission Control Protocol/Internet Protocol (TPC/IP). Thus, the server satellite and the client spacecraft operate as Internet hosts and each has a unique IP address. The network protocols have been modified to meet the constraints of a space-based communication network. Such modifications must take into account the differences between a space-based communication channel and a ground-based communication channel. For example in ground based communication channels—which typically use copper or fiber-optic cable as the transmission media, traffic fails to be delivered to its destination mainly due to network congestion. However, in space-based communication, which typically uses free-space RF or optical transmissions as the transmission media, traffic fails to be delivered to its destination mainly due to dropouts. Dropouts are periods in which the signal to noise ratio of the channel falls below the level necessary for at least minimally reliable communications. In the present invention, the network protocols that are used must be modified to deal with dropouts, rather than just network congestion.

The client spacecraft may be any type of spacecraft, which may perform any type of mission. In a homogeneous embodiment, all client spacecraft shown in FIG. 2 are similar types of spacecraft performing similar types of missions. In a heterogeneous embodiment, the client spacecraft include different types of spacecraft performing different missions.

Figure 3:
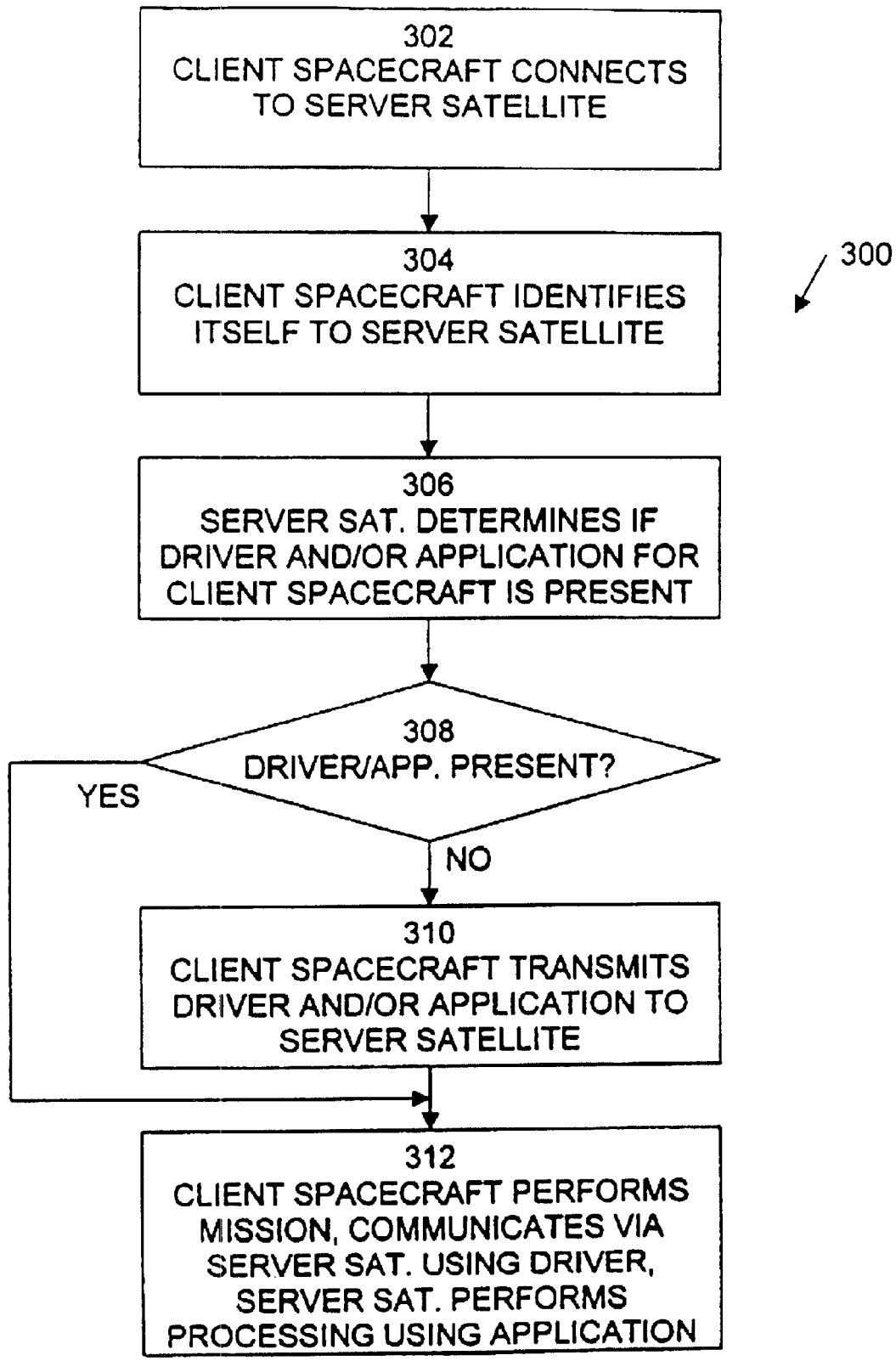
FIG. 3 is an exemplary flow diagram of a process of operation of the present invention.

An exemplary process 300 by which additional client spacecraft are added to a space-based network, such as the local space-based network shown in FIG. 2, is shown in FIG. 3. Process 300 begins with step 302, in which a client spacecraft that has been place in orbit or on a mission trajectory establishes a communication connection with a server satellite. This connection is established using a standard network protocol, such as TCP/IP, modified as described above. In step 304, the client spacecraft identifies itself to the server satellite over the communication connection established in step 302. In step 306, the server satellite determines whether the driver and/or application software necessary to support the mission of the client spacecraft is present in the server satellite.

Driver software is software that controls or talks to a device, in this case, the client spacecraft. A driver acts like a translator between the device and application software that uses the device. Each device has its own set of specialized commands that only its driver knows. In contrast, most application software accesses devices by using generic commands. The driver, therefore, accepts generic commands from an application program and then translates them into specialized commands for the device. In the context of the present invention, the driver typically controls communications with and the acquisition of data from a client spacecraft.

Application software is software that performs processing to accomplish an end function, that is, a function the performance of which is an end that a user desires. For example, application software may include database programs, which store and retrieve data for a user, word processors, which allow the preparation of textual documents, and spreadsheets, that generate numerical data. In the context of the present invention, application software performs processing on data received from a client spacecraft or processes or generates data to be transmitted to a client spacecraft. For example, application software may perform signal processing, image manipulation, etc., on data received from a client spacecraft.

In step 308, if, in step 306, it was determined that the driver and/or application software necessary to support the mission of the client spacecraft is not present in the server satellite, then process 300 continues with step 310, in which the client spacecraft transmits the necessary driver and/or application software to the server satellite. The server satellite then installs the driver and/or application software, preparing it for use. Process 300 then continues with step 312. In step 308, if, in step 306, it was determined that the driver and/or application software necessary to support the mission of the client spacecraft is present in the server satellite, then process 300 continues with step 312.

In step 312, the client spacecraft performs its mission, with communications being provided via the server satellite. The server satellite communicates with the client satellite using the installed driver software and may perform additional processing using the installed application software.

Figure 4:
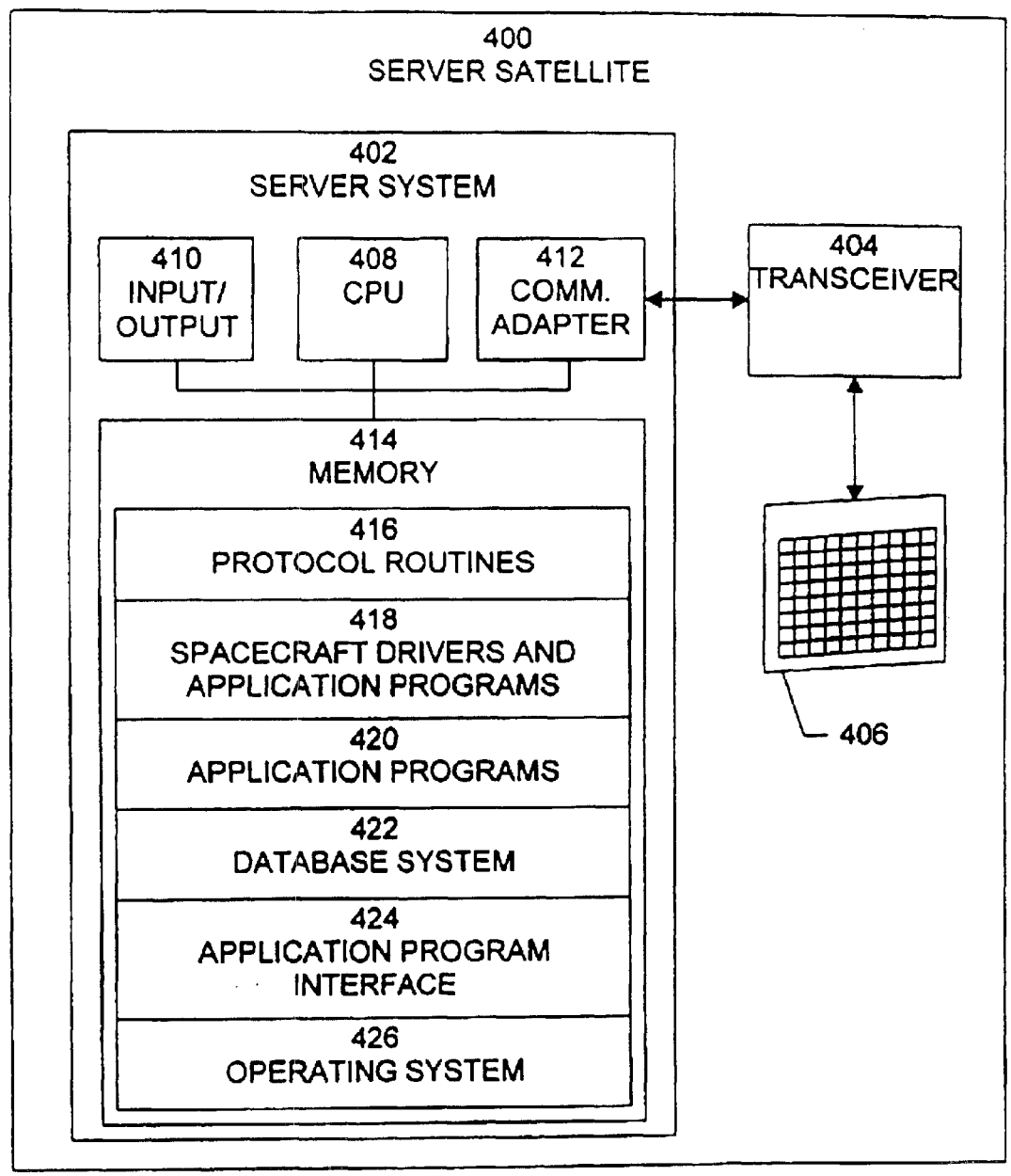
FIG. 4 is an exemplary block diagram of a server satellite shown in FIGS. 1, 2, and 5–7.

An exemplary block diagram of a server satellite 400, according to the present invention, is shown in FIG. 4. Server satellite 400 includes a satellite platform (not shown), server system 402, transceiver 404 and communications antenna 406. The satellite platform is typically a standard communications satellite, which has been modified to accept and operate server system 402. Communications antenna 406 transmits and receives RF signals, which are typically UHF RF signals. Other communications media, such as optical communications, or radio frequency communications at frequencies above or below the ultra-high frequency band may also be used, with the addition of appropriate hardware, such as laser emitters and receives, and/or antennas operable at other frequencies. Antenna 406 is connected to transceiver 404, which generates electrical signals that are transmitted by antenna 406, and which receives and demodulates signals received by antenna 406. Transceiver 404 is connected to server system 402.

Server system 402 is typically a programmed general-purpose computer system, similar in architecture to a standard ground-based server system, but adapted for use in space. For example, routers and servers made by CISCO SYSTEMS®, modified for use in the environmental conditions prevailing in space, may be used. Server system 402 includes processor (CPU) 408, input/output circuitry 410, communications adapter 412, and, memory 414. CPU 408 executes program instructions in order to carry out the functions of the present invention. Typically, CPU 408 is a microprocessor, such as an INTEL PENTIUM® processor, or other space qualified processor. Input/output circuitry 410 provides the capability to input data to, or output data from, server system 402. For example, telemetry data relating to the operation and condition of server satellite 400 may be input to server system 401 via input/output circuitry 410. Likewise, command data to control the operation of server satellite 400 may be output from server system 402 via input/output circuitry 410. Alternatively, telemetry and command and control data may be transmitted and received via means other than server system 402. Communications adapter 412 interfaces server system 402 with transceiver 404. Together, communications adapter 412 and transceiver 404 convert data generated by server system 402 into modulated RF signals to be transmitted via antenna 406. Likewise, together, communications adapter 412 and transceiver 404 convert modulated RF signals received via antenna 406 into data input to server system 402. The communications channel provided by communications adapter 412, transceiver 404 and antenna 406 provide the capability to connect server system 402 to a data communications network, such as a standard local area network (LAN) or wide area network (WAN), such as Ethernet, Token Ring, the Internet, or a private or proprietary LAN/WAN.

Memory 414 stores program instructions that are executed by, and data that are used and processed by, CPU 402 to perform the server functions of the present invention. Memory 414 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 414 includes a plurality of blocks of program instructions, such as protocol routines 416, spacecraft drivers and application programs 418, other application programs 420, database system 422, application program interface 424, and operating system 426. Operating system 426 performs basic tasks, such as recognizing input from and sending output to external devices, keeping track of files and directories in memory, and controlling peripheral devices. The operating system also controls the execution of the different programs and users that running at the same time and is responsible for security, ensuring that unauthorized users do not access the system. Operating system 426 provides a software platform on top of which other programs, such as application programs 420, can run. The application programs run on top of the operating system using application program interface 424. Application program interface 424 is a set of routines, protocols, and tools for building software applications, such as application programs 420. Application programs 420 include one or more programs or groups of programs designed to perform useful end functions in the system.

Database system 422 includes a database management system (DBMS) and a database. A DBMS is a collection of programs that provide the capability to store information to, modify information in, and extract information from the database. The database is an organized collection of data stored in one or more data files. There are many different types of database management systems, ranging from small systems that run on personal computers to huge systems that run on mainframes. From a technical standpoint, DBMSs can differ widely. The terms relational, network, flat, and hierarchical all refer to the way a DBMS organizes information internally. The internal organization can affect how quickly and flexibly information may be extracted. Requests for information from a database are made in the form of a query, which is a stylized question. The set of rules for constricting queries is known as a query language. Different database management systems support different query languages, although there is a semi-standardized query language called structured query language (SQL). The information from a database can be presented in a variety of formats. Database system 422 may include any standard database system, such as ORACLE® or SYBASE®, etc.

Spacecraft drivers and application programs 418 include software programs that provide the capability to perform processing that is specialized for each client spacecraft in the network served by server satellite 400. In particular, the driver application software performs processing necessary to support the mission of the client spacecraft. Driver software is software that controls or talks to a device, in this case, the client spacecraft. A driver acts like a translator between the device and application software that uses the device. Each device has its own set of specialized commands that only its driver knows. In contrast, most application software accesses devices by using generic commands. The driver, therefore, accepts generic commands from an application program and then translates them into specialized commands for the device. Application software is software that performs an end function, that is, a function the performance of which is an end that a user desires. For example, application software may include database programs, which store and retrieve data for a user, word processors, which allow the preparation of textual documents, and spreadsheets, that generate numerical data. In the context of the present invention, application software may perform signal processing, image manipulation, etc., to generate data desired by a user.

Protocol routines perform processing necessary to perform the communication protocols that conduct the communications between devices, such as between the server satellite and the client spacecraft, and between the server satellite and the ground terminal. Preferably, a standard network protocol is used, such as TCP/IP, modified for space-based communications. Typically, the protocol determines the type of error checking to be used, the data compression method, if any, how the sending device will indicate that it has finished sending a message, and how the sending device will indicate that it has finished sending a message, and how the receiving device will indicate that it has received a message.

Figure 5:
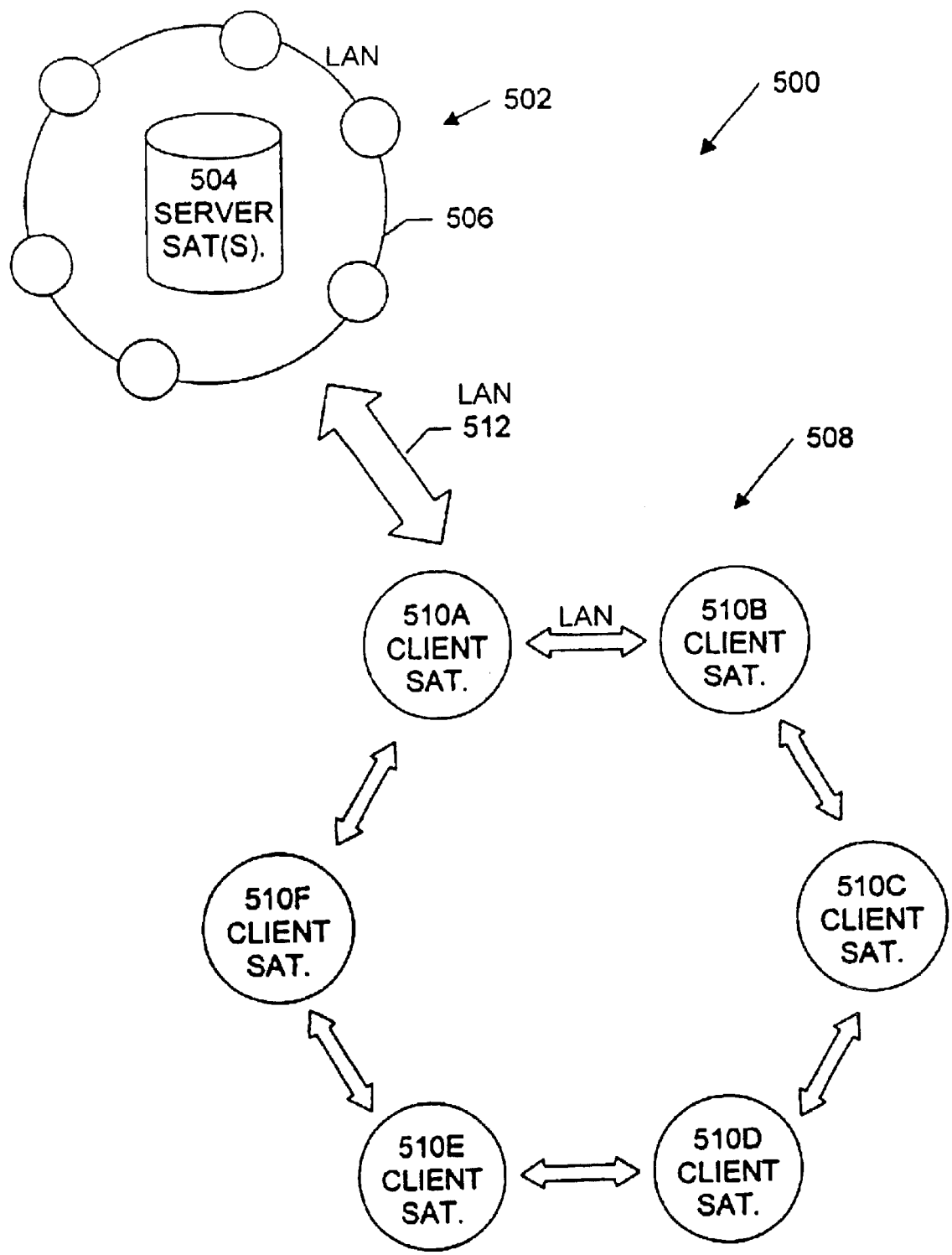
FIG. 5 is an exemplary block diagram of another embodiment of the present invention.

An exemplary expanded space-based network 500 is shown in FIG. 5. This example illustrates a homogeneous network, in which all client satellites are of the same or similar type and performing similar missions. Network 500 includes local network 502, which includes server satellite (or satellites) 504 and local client spacecraft 506, and remote network 508. Server satellite 504 is in communication with one or more ground terminals in an arrangement similar to that shown in FIG. 1. Likewise, as shown in FIG. 1, the ground terminals are connected to the Internet. Remote network 508 includes one or more client spacecraft, such as remote client spacecraft 510A–510F, which communicate with server satellite 504 over communication channel (or channels) 512. Remote client spacecraft 510A–510F may also be in communication with each other directly. The communication channels shown in FIG. 5 are exemplary only, not all possible communication channels are shown. The present invention, however, contemplates any and all possible communication channels, such as client to client, client to server, server to server, and server to ground communication channels. Preferably, client spacecraft communicate with users on Earth via server satellite 504. Together, server satellite 504 and remote client spacecraft 510A–510F form an extended space-based network.

Figure 6:
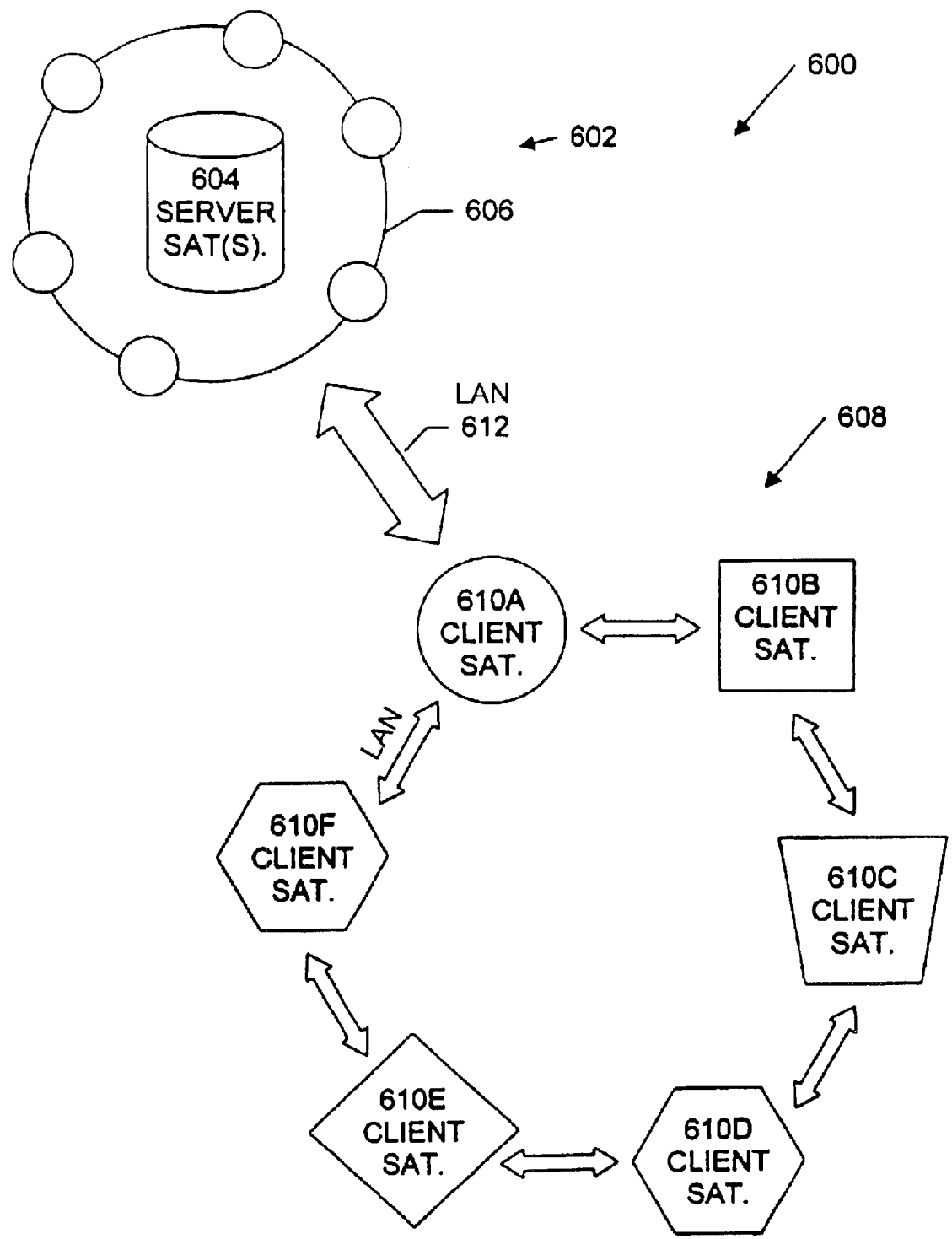
FIG. 6 is an exemplary block diagram of another embodiment of the present invention.

Another exemplary expanded space-based network 600 is shown in FIG. 6. This example illustrates a heterogeneous network, in which not all client satellites are of the same or similar type and performing similar missions. Network 600 includes local network 602, which includes server satellite (or satellites) 604 and local client spacecraft 606, and remote network 608. Server satellite 604 is in communication with one or more ground terminals in an arrangement similar to that shown in FIG. 1. Likewise, as shown in FIG. 1, the ground terminals are connected to the Internet. Remote network 608 includes one or more client spacecraft, such as remote client spacecraft 610A–610F, which communicate with server satellite 604 over communication channel (or channels) 612. Remote client spacecraft 610A–610F may also be in communication with each other directly. As shown, the client spacecraft include some spacecraft of different types and some spacecraft of similar type. The arrangement and selection of satellite type are exemplary only. The present invention contemplates any and all possible arrangements and selections of satellite types.

Figure 7:
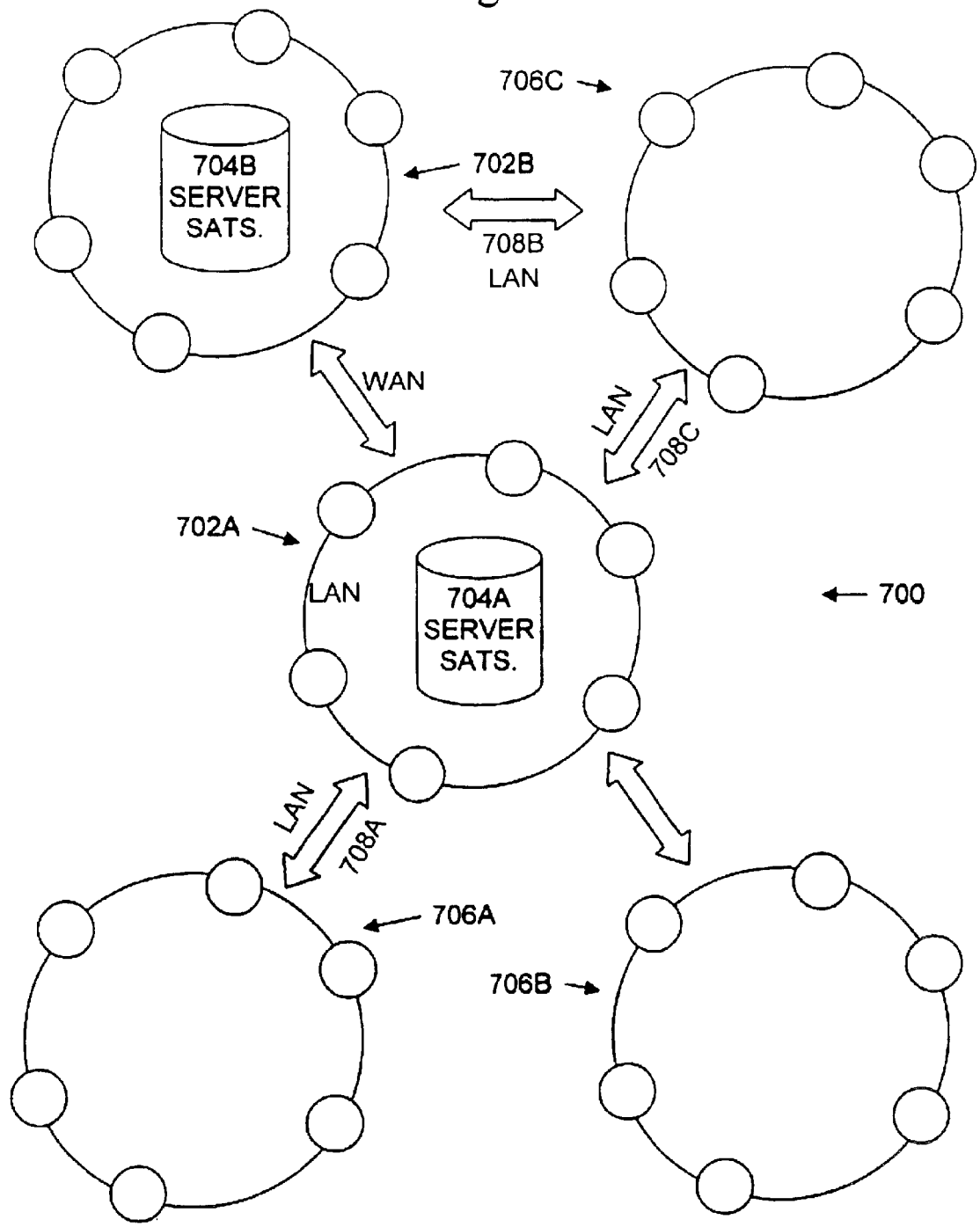
FIG. 7 is an exemplary block diagram of another embodiment of the present invention.

An exemplary multi-level space-based network 700 is shown in FIG. 7. Network 700 includes a plurality of local networks, such as local networks 702A and 702B, each of which includes a server satellite (or satellites) such as server satellites 704A and 704B and local client spacecraft. Client satellites in the local networks may communicate with the ground and with client satellites in other local networks via the associated server satellites. Network 700 also includes a remote client networks, such as remote networks 706A–706C. Server satellites 704A and 704B are in communication with one or more around terminals in an arrangement similar to that shown in FIG. 1. Likewise, as shown in FIG. 1, the ground terminals are connected to the Internet. Remote networks 706A–706C includes one or more client spacecraft, which communicate with one or more server satellite over one or more communication channels. For example, remote network 706A communicates with server satellite 704A over communication channel 708A, while remote network 706C communicates with server satellites 704A and 704B over communication channels 708B and 708C, respectively. The remote client spacecraft may also be in communication with each other directly, but preferably, only the remote client spacecraft within a particular remote network are in communication with each other directly. The communication channels shown in FIG. 7 are exemplary only, not all possible communication channels are shown. The present invention, however, contemplates any and all possible communication channels, such as client to client, client to server, server to server, and server to ground communication channels.

As discussed above, communications may be performed between a server spacecraft and another server spacecraft, between a server spacecraft and a client spacecraft, or between a client spacecraft and another client spacecraft. A spacecraft may be a satellite or other type of spacecraft. The communications include data communication, energy communication, or other types of communications. For example, the data communication enables a client spacecraft to transmit driver software or application software to a server spacecraft. As another example, the energy communication enables a server spacecraft to transmit electric energy to a client spacecraft. The electric energy can provide electric power to various components of the client spacecraft. The energy communication can take the form of optical beam or RF signal.

The communications between spacecrafts are usually achieved over communication networks. The communication networks include local area networks (LANS) and wide area networks (WANs). For example, the local area networks support communications between a client spacecraft and another client spacecraft, such as between client spacecrafts within the local cluster 502, between client spacecrafts within the remote cluster 508, between client spacecrafts within the local cluster 602, between client spacecrafts within the remote cluster 608. Also, the local area networks may support communications between a server spacecraft and a client spacecraft, such as between a client spacecraft of the remote cluster 508 and the server spacecraft 504, and between a client spacecraft of the remote cluster 608 and the server spacecraft 604.

Figure 8:
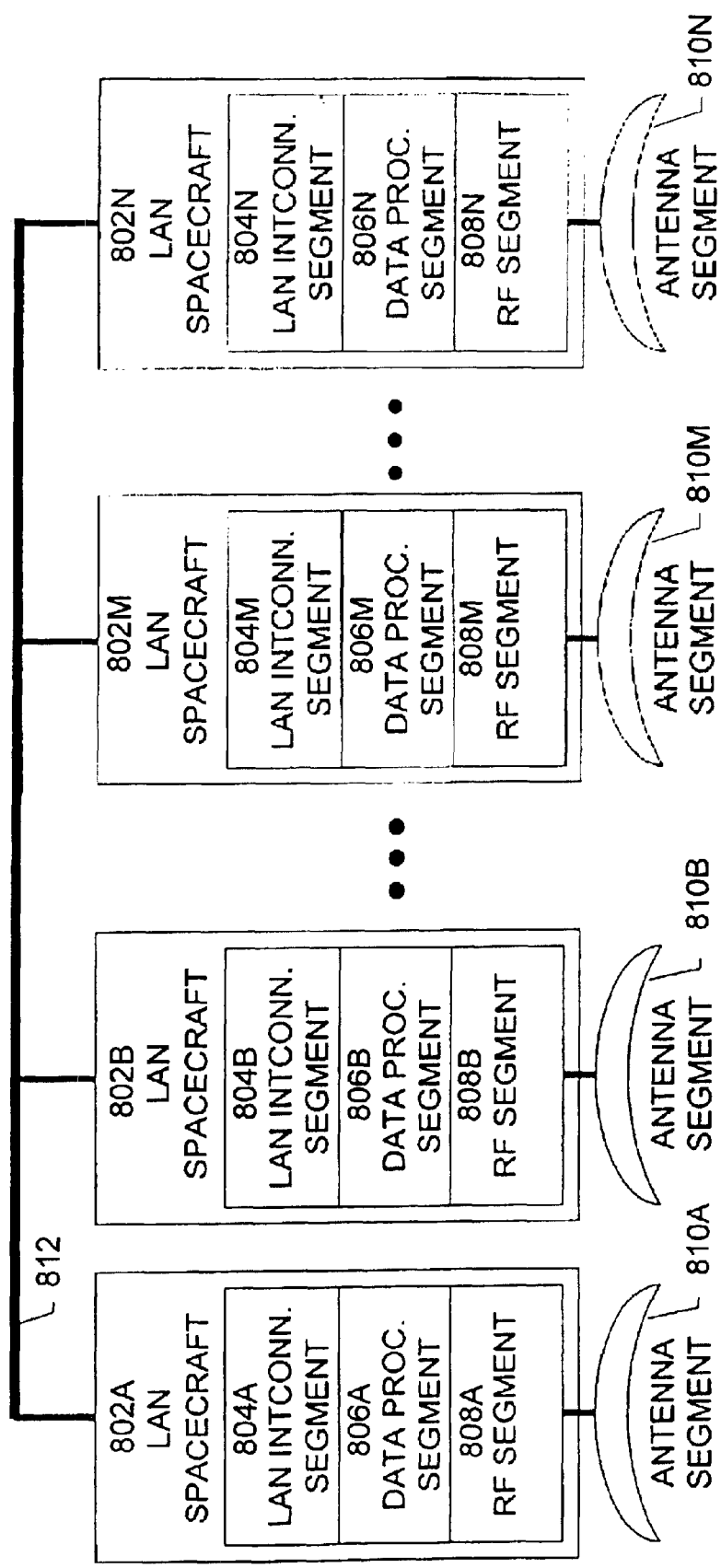
FIG. 8 is an exemplary block diagram of a local area network (LAN) according to one embodiment of the present invention.

An exemplary block diagram of a local area network (LAN) is shown in FIG. 8 according to one embodiment of the present invention. This diagram is merely an illustration, which should not unduly limit the scope of the claims. One of ordinary skill in the art would recognize many variations, alternatives, and modifications. The LAN 812 includes a plurality of satellites, such as satellites 802A, 802B, . . . , 802M, . . . , and 802N. Each satellite includes a LAN interconnect segment, an optional data processing segment, an RF segment, and an antenna segment. As indicated, the data processing segment is optional. For example, the satellite 802A includes a LAN interconnect segment 804A, an optional data processing segment 806A, an RF segment 808A, and an antenna segment 810A. The antenna segment receives and transmits communications signals. The RF segment processes the signals received by the antenna segment and process the signals to be transmitted by the antenna segment. The data processing segment processes the communications traffic and determines the proper routing of communication signals. For example, the communication signals include an information packet. As described above, the data processing segment is optional. A spacecraft that serves as a base station for LAN usually has the data processing segment, but a spacecraft that does not serve as a base station usually do not have the data processing segment. The LAN interconnect segment provides the satellite with the functionality to communicate over LAN.

As shown in FIG. 8, the LAN 812 includes the LAN spacecrafts 802A, 802B, . . . , 802M, . . . , and 802N. These LAN spacecrafts may include at least one server spacecraft and at least one client spacecraft. One or more of these LAN spacecrafts serve as base stations for the LAN 812 and provide network coverage for the LAN spacecrafts. Usually the base stations are server spacecrafts. The distance between these LAN spacecrafts varies. For example, the distance may equal to about 64 km. The base-station spacecrafts can perform networking functions such as relay, control, and logic functions. The relay function includes receiving, amplifying, and transmitting communication signals, but these base-station spacecrafts are more powerful than simple relay spacecrafts. The base-station spacecrafts perform control and logic functions, such as switching, routing, channel assignment, and quality service. The routing process usually involves determination of next network point to which a received communication signal should be forwarded toward its final destination. For instance, the routing process determines the desired route for a given communication signal. For the LAN 812, the next network point is for example a LAN spacecraft, and the final destination is for example also a LAN spacecraft. The routing process can also involve determining timing for transmitting a received signal and delays of the received signal and the transmitted signal. The LAN spacecrafts 802A, 802B, . . . , 802M, . . . , and 802N are users of the LAN 812. These user spacecrafts request information from each other through the LAN 812, and use received information to perform various spacecraft functions.

As shown in FIG. 8, the LAN 812 carries communication signals. For example, the rate for data communications can be as high as 4 gbps. Additionally, the LAN 812 includes base-station spacecrafts at various distances. For example, a base station may be 200 km away from its nearest base station. Moreover, the LAN spacecrafts move with respect to each other. The movement includes change in position, change in orientation, or both, and this movement usually requires that the LAN 812 have navigation capabilities. For example, a base-station spacecraft of the LAN 812 can seek and obtain spatial information of other LAN spacecrafts. The spatial information includes positions and orientations of other LAN spacecrafts with respect to the base-station spacecraft.

The LAN 812 uses a RF crosslink, an optical crosslink, or other type of crosslink. The LAN crosslink is preferably a relatively low powered link with a range limited to about 200 kilometers (km). If necessary, multiple LANs may be provided, in order to increase the data bandwidth. Multiple LANs may be implemented by using multiple RF or optical frequencies, or if the directivity is sufficient, multiple beams on the same frequency.

In one embodiment of the present invention, three to five spacecrafts would be used in the LAN 812. Each spacecraft in the LAN would have a 125 megahertz (MHz) frequency allocation, which would provide a data bandwidth of about 2 gbps. In another embodiment for military use, the spacecrafts would use the military KA band and would include anti-jamming capabilities.

Figure 9:
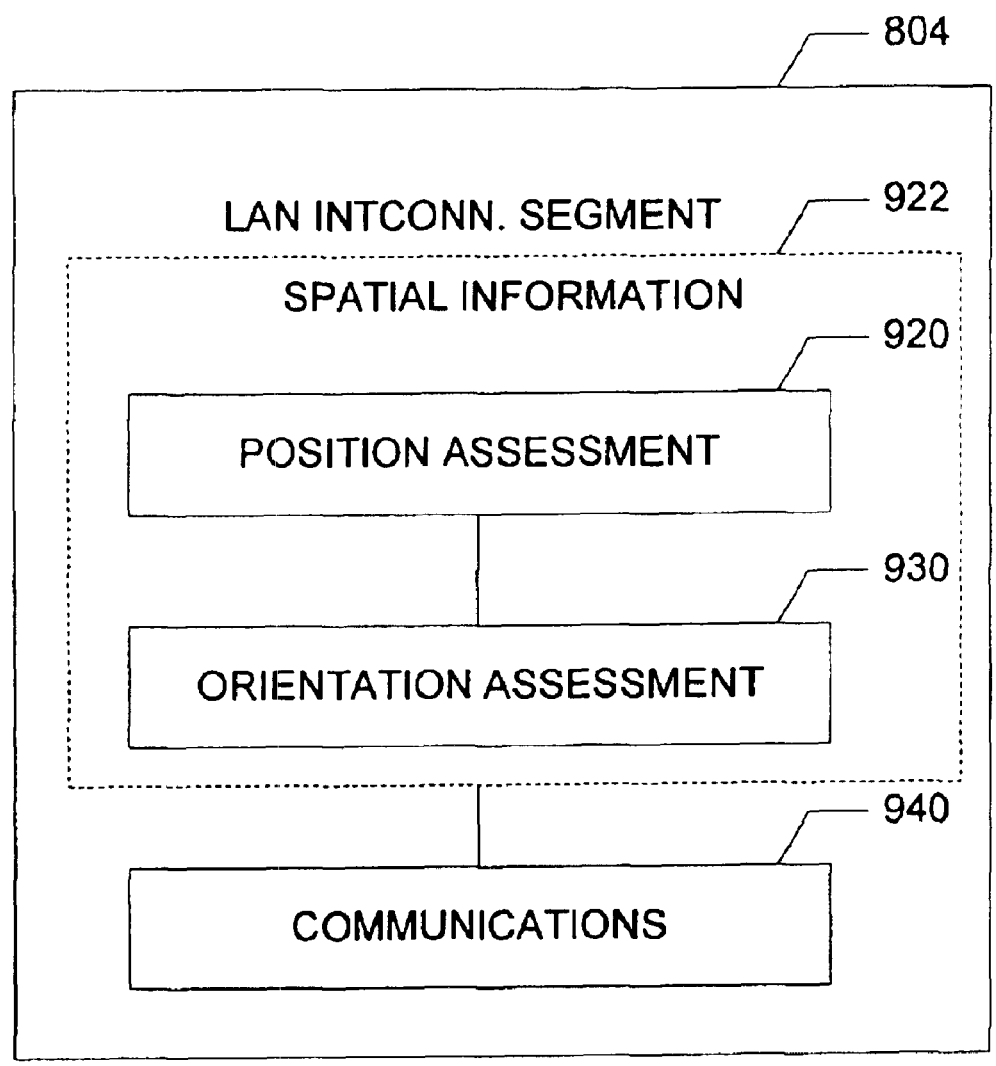
FIG. 9 is a simplified diagram for LAN interconnect segment according to one embodiment of the present invention.

FIG. 9 is a simplified diagram for LAN interconnect segment according to one embodiment of the present invention. This diagram is merely an illustration, which should not unduly limit the scope of the claims. One of ordinary skill in the art would recognize many variations, alternatives, and modifications. The LAN interconnect segment 804 is any one of the LAN interconnect segments 804A, 804B, . . . , 804M, . . . , and 804N. The LAN interconnect 804 includes a spatial information system 922 and a communications system 940. The system spatial information 922 includes a position assessment system 920 and an orientation assessment system 930. Although the above has been shown using systems 922, 920, 930, and 940, there can be many alternatives, modifications, and variations. For example, some of the systems may be expanded and/or combined. The position assessment system 920 and the orientation assessment system 930 may be combined. Other systems may be inserted to those noted above. Depending upon the embodiment, the specific systems may be replaced. Further details of these systems are found throughout the present specification and more particularly below.

The spatial information system 922 transmits and receives spatial information for the LAN spacecrafts 802A, 802B, . . . , 802M, . . . , and 802N. Also the system 922 sends the obtained spatial information to the communications system 940. More specifically, the position assessment system 920 transmits and receives position information for the LAN spacecrafts. Orientation assessment system 930 transmits and receives orientation information for the LAN spacecrafts. The obtained position and orientation information can help the communications system 940 orientate its transmitter and receiver. The communications system 940 sends and receives communication signals.

The navigation capability as embodied in the spatial information system 922 is important for the LAN 812. For example, the LAN 812 has the capability to perform high-speed communications over large distance. Such long-distance communications usually utilize transmitters with significant transmission power. But high-power transmitters are usually heavy. The LAN spacecrafts 802A, 802B, . . . , 802M, . . . , and 802N however usually have limited energy resources and significant weight limitations. To reduce energy consumption and transmitter weight, the base stations in the LAN 412 usually direct their communication signals to other base stations or user spacecrafts, as opposed to sending out the signals into all directions. The directional transmission usually involves obtaining navigation information and aligning transmitters and receivers. The wireless connection between two LAN spacecrafts may take various forms, such as RF connection and optical connection including laser.

Figure 10:
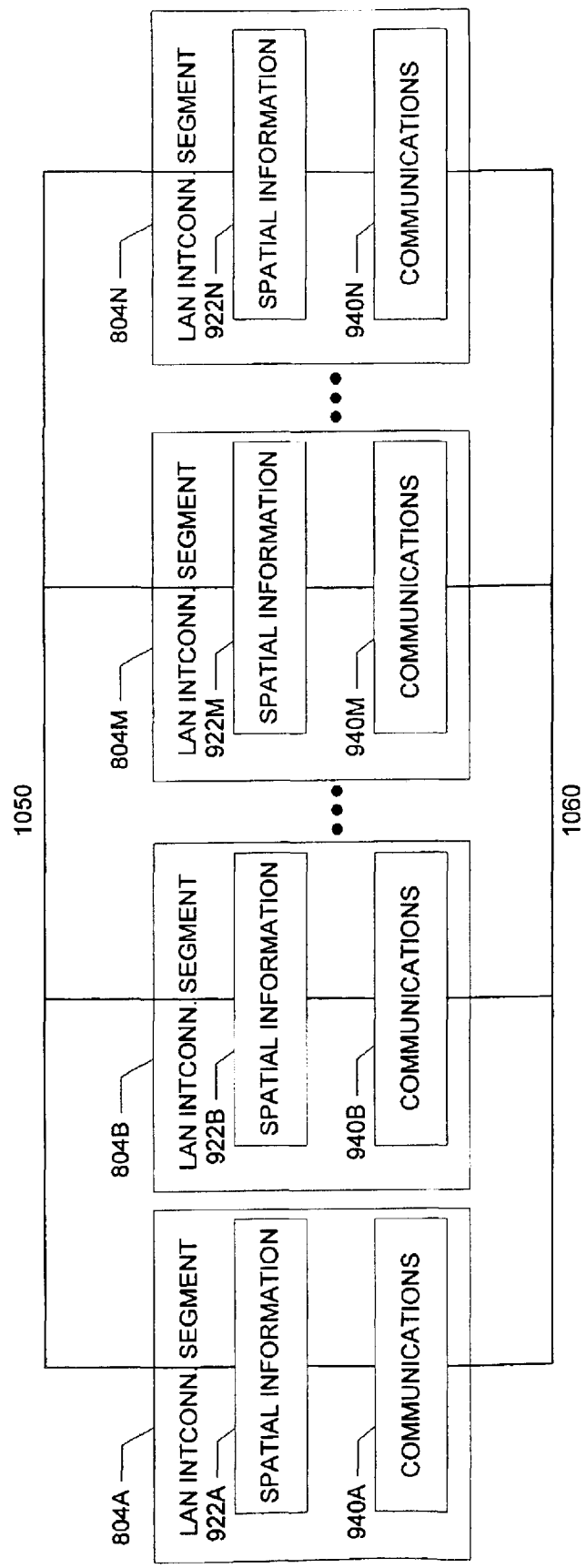
FIG. 10 is a simplified diagram showing network structure of LAN according to an embodiment of the present invention.

FIG. 10 is a simplified diagram showing network structure of LAN according to an embodiment of the present invention. This diagram is merely an illustration, which should not unduly limit the scope of the claims. One of ordinary skill in the art would recognize many variations, alternatives, and modifications. The LAN 812 includes two wireless network, i.e., a wireless network 1050 for spatial information and a wireless network 460 for communications. These two wireless networks may operate as a single wireless network or as two separate wireless networks. The wireless networks 1050 and 1060 are formed respectively between each of the LAN spacecrafts 802A, 802B, . . . , 802M, . . . , and 802N as shown in FIG. 8. The wireless network 1050 for spatial information includes at least a communication channel to transmit and receive spatial information between at least two of the LAN spacecrafts 802A, 802B, . . . , 802M, . . . , and 802N. As shown in FIG. 10, the wireless network 1050 uses spatial information systems 922A, 922B, . . . , 922M, . . . , and 922N. These spatial information systems are respectively parts of the LAN interconnect segments 804A, 804B, . . . , 804M, . . . , and 804N, as described in FIG. 9. These interconnect segments correspond to the LAN spacecrafts 802A, 802B, . . . , 802M, . . . , and 802N respectively. Each of these LAN spacecrafts has spatial information indicative of position and orientation of each of these spacecrafts respectively. The wireless network 1060 for communications uses communications systems 940A, 940B, . . . , 940M, . . . , 940N. These communications systems are respectively parts of the LAN interconnect segments 804A, 804B, . . . , 804M, . . . , and 804N, as shown in FIG. 9. These interconnect segments correspond to the LAN spacecrafts 802A, 802B, . . . , 802M, . . . , and 802N respectively. The communications systems 940A, 940B, . . . , 940M, . . . , and 940N each have a receiver to receive signals. For example, the signals carries electric energy and routing information. As another example, the signals carries data and routing information. The routing information provides at least information for a destination spacecraft as a destination of the signals. For example, the routing information is stored in the headers of information packets. Data processing segments on basestation spacecrafts each serve as a routing system to determine a desire route from a group of routes to transmit the signals from the spacecraft receiving the signals to the destination spacecraft based on at least the spatial information of the LAN spacecrafts 802A, 802B, . . . , 802M, . . . , and 802N. Each route includes a group of path spacecrafts comprising the receiving spacecraft and the destination spacecraft or comprising the receiving spacecraft, the destination spacecraft, and at least one of the other LAN spacecrafts 802A, 802B, . . . , 802M, . . . , and 802N. Additionally, the communications systems 940A, 940B, . . . , 940M, . . . , and 940N each provide a transmitter to transmit the signals based upon the desired route and the spatial information of the path spacecrafts of the desired route. The spatial information of the path spacecrafts of the desired route provides for transferring the signals from the receiving spacecraft to the destination spacecraft. The receiving spacecraft, the destination spacecraft and other path spacecrafts are usually selected from the LAN spacecrafts 802A, 802B, . . . , 802M, . . . , and 802N.

Additionally, the optional data processing segments 806A, 806B, . . . , 806M, . . . , and 806N at a later time step receive updated spatial information of the LAN spacecrafts 802A, 802B, . . . , 802M, . . . , and 802N. In response, these data processing segments determine a updated desired route based on at least the updated spatial information of the LAN spacecrafts. The updated desired route and the pre-update desired route may be the same route or different routes. The transmitters of the communications systems 940A, 940B, 940M, . . . , and 940N transmit the signals based upon the updated desired route and the updated spatial information of the path spacecrafts of the updated desired route. The updated spatial information of the path spacecrafts provides for transferring the signals from the receiving spacecraft to the destination spacecraft.

Figure 11:
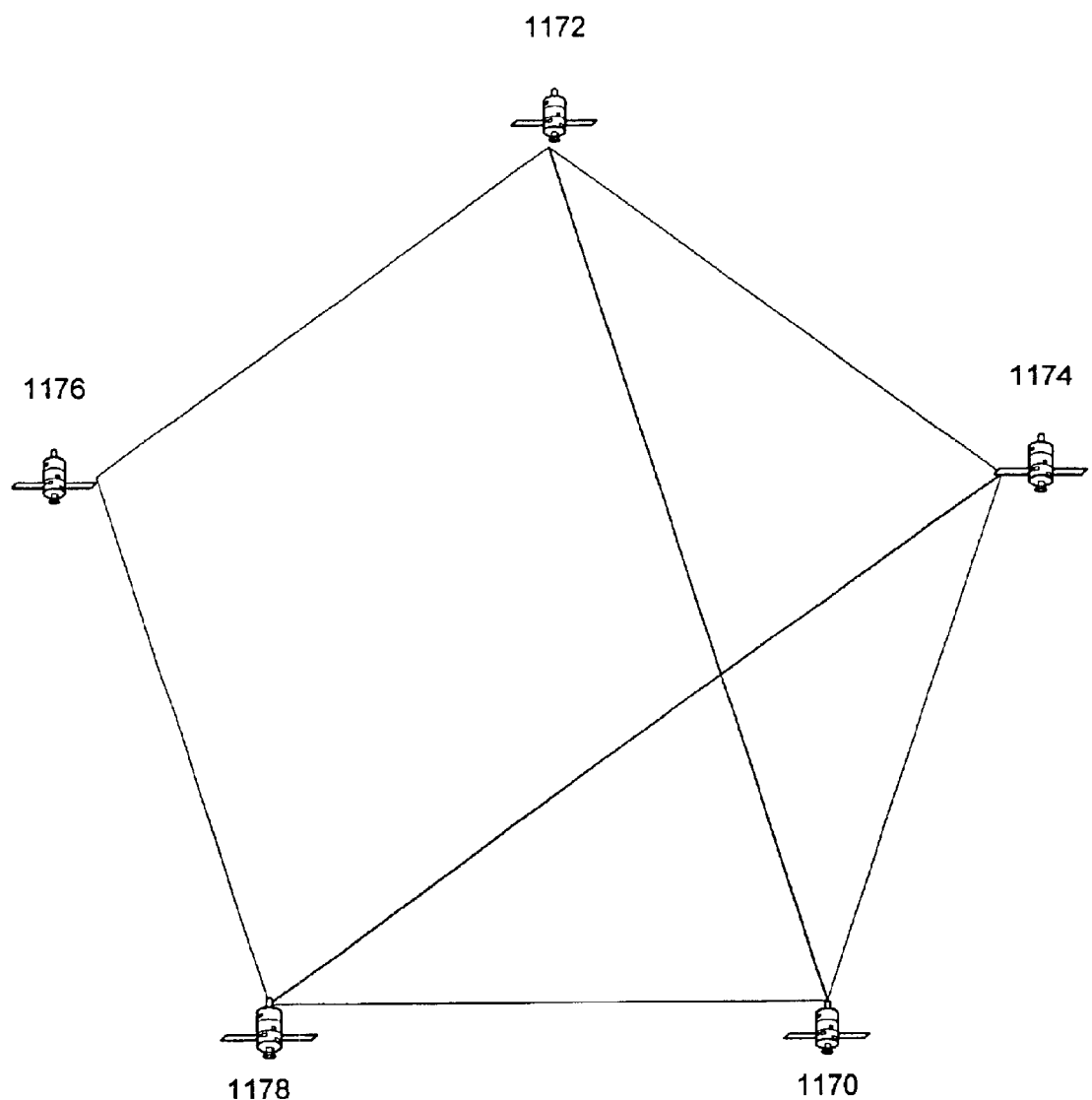
FIG. 11 is a simplified diagram for communication routes according to one embodiment of the present invention.

FIG. 11 is a simplified diagram for communication routes according to one embodiment of the present invention. This diagram is merely an illustration, which should not unduly limit the scope of the claims. One of ordinary skill in the art would recognize many variations, alternatives, and modifications. Spacecrafts 1170, 1172, 1174, 1176 and 1178 are examples of the LAN spacecrafts 802A, 802B, . . . , 802M, . . . , and 802N. For example, the spacecraft 1170 is a receiving spacecraft that receives a signal, and the signal identifies the spacecraft 1172 as its destination spacecraft. From the spacecraft 1170 to the spacecraft 1172, there exist multiple paths corresponding to different groups of path spacecrafts. For example, a route may take a direct path from the spacecraft 1170 to the spacecraft 1172. Alternatively, a route may take an indirect path from the spacecraft 1170 to the spacecraft 1172. For example, the route passes the spacecrafts 1170, 1174, 1178, 1176 and 1172, spacecrafts 1170, 1174, and 1172, spacecrafts 1170, 1178, 1174, and 1172, or any other group of path spacecrafts. In one embodiment of the present invention, the receiving spacecraft 1170 is a base station, and the spacecraft 1170 selects a desired route to the destination spacecraft 1172. In another embodiment of the invention, the receiving spacecraft 1170 is not a base station of the LAN 812. The receiving spacecraft communicates with a base station about a desired route. In yet another embodiment, the receiving spacecraft 1170 is not a base station. The receiving spacecraft 1170 relays the communication signal to a base station, and the base station serves as a new receiving spacecraft and selects a desired route to the destination spacecraft 1172.

FIG. 12 is a simplified diagram of LAN routing database for data processing segment according to one embodiment of the present invention. This diagram is merely an illustration, which should not unduly limit the scope of the claims. One of ordinary skill in the art would recognize many variations, alternatives, and modifications. The optional data processing segments 806A, 806B, . . . , 806M, . . . , 806N each have a routing database 1280. For example, the routing database 1280 for the spacecraft 1170 includes a lists of routes from the spacecraft 1170 to different destinations such as the spacecraft 1172 and other spacecrafts. As illustrated in FIG. 12, various routes correspond to different groups of path spacecrafts. For instance, route 2 starts from the spacecraft 1170, passes through the spacecrafts 1174, 1178, and 1176, and arrives at the spacecrafts 1172. Hence the spacecrafts 1170, 1174, 1178, 1176, and 1172 are the path spacecrafts for route 2. Additionally, routing database 1280 also contains route information corresponding to each route and uses such information to select a desired route.

Figure 13:
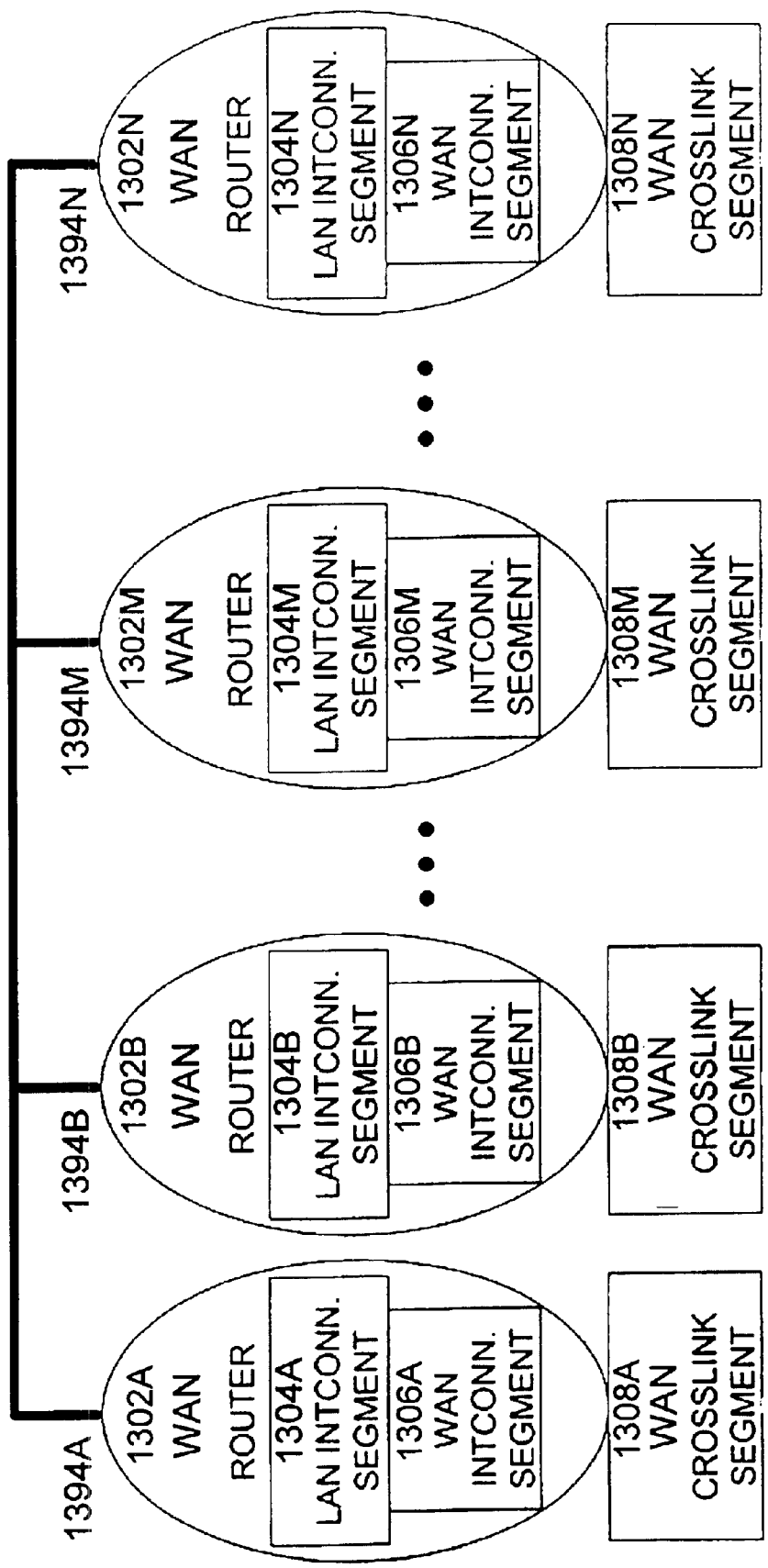
FIG. 13 is an exemplary block diagram of a wide area network (WAN) according to an embodiment of the present invention.

An exemplary block diagram of a wide area network (WAN) is shown in FIG. 13 according to an embodiment of the present invention. This diagram is merely an illustration, which should not unduly limit the scope of the claims. One of ordinary skill in the art would recognize many variations, alternatives, and modifications. The WAN 1312 includes a plurality of WAN spacecrafts, such as spacecrafts 1394A, 1394B, . . . , 1394M, . . . , and 1394N. These spacecrafts each include a WAN router 1302A, 1302B, . . . , 1302M, . . . , and 1302N. For example, the WAN router 1302M comprises a LAN interconnect segment 1304M, a WAN interconnect segment 1306M and an WAN crosslink segment 1308M. The LAN interconnect segment 1304M provides the WAN router 1302M with the functionality to communicate over LAN, such as the LAN 812. The WAN interconnect segment 1306M provides the WAN router 1302M with the functionality to communicate over the WAN 1312. The WAN crosslink segment 1308M is the hardware that provides the communication channel over which the WAN 1312 is carried.

As shown in FIG. 13, the WAN 1312 includes the WAN spacecrafts 1394A, 1394B, . . . , 1394M, . . . , and 1394N. For example, all of these spacecrafts are server spacecrafts having the WAN routers and serving as base stations for the WAN 1312. The WAN routers perform networking functions such as relay, control, and logic functions. The relay function includes receiving, amplifying, and transmitting communication signals, but these WAN routers are more powerful than simply relay spacecrafts. The WAN routers perform control and logic functions, such as switching, routing, channel assignment, and quality of service. The routing process usually involves determination of next network point to which a received communication signal should be forwarded toward its final destination. For instance, the routing process determines the desired route for a given communication signal. For the WAN 1312, the next network point is for example a WAN base station, and the final destination is for example also a WAN base station or a LAN spacecraft that is not a WAN base station but shares the same LAN with a WAN base station. The routing process can also involve determining timing for transmitting a received signal, and delays of the received signal and the transmitted signal.

Moreover, the WAN spacecrafts 1394A, 1394B, . . . , 1394M, . . . , and 1394N are not only base stations but also users of the WAN 1312. These users request information from each other through the WAN 1312, and utilize received information to perform various spacecraft functions, such as transmitting the information to other spacecrafts within the same LAN as the WAN spacecrafts respectively.

As shown in FIG. 13, the WAN 1312 carries communication signals. For example, the rate of data communications can be as high as 1 gbps. Additionally, the WAN 1312 includes base-station spacecrafts at various distances. For example, a base station may be from 100 km to 100,000 km away from its nearest base station. Moreover, the WAN routers move with respect to each other. The movement includes change in position, change in orientation, or both, and this movement usually requires that the WAN 1312 have navigation capabilities. For example, a base station of the WAN 1312 can seek and obtain spatial information of other base stations. The spatial information includes positions and orientations of other WAN routers with respect to the base station.

Figure 14:
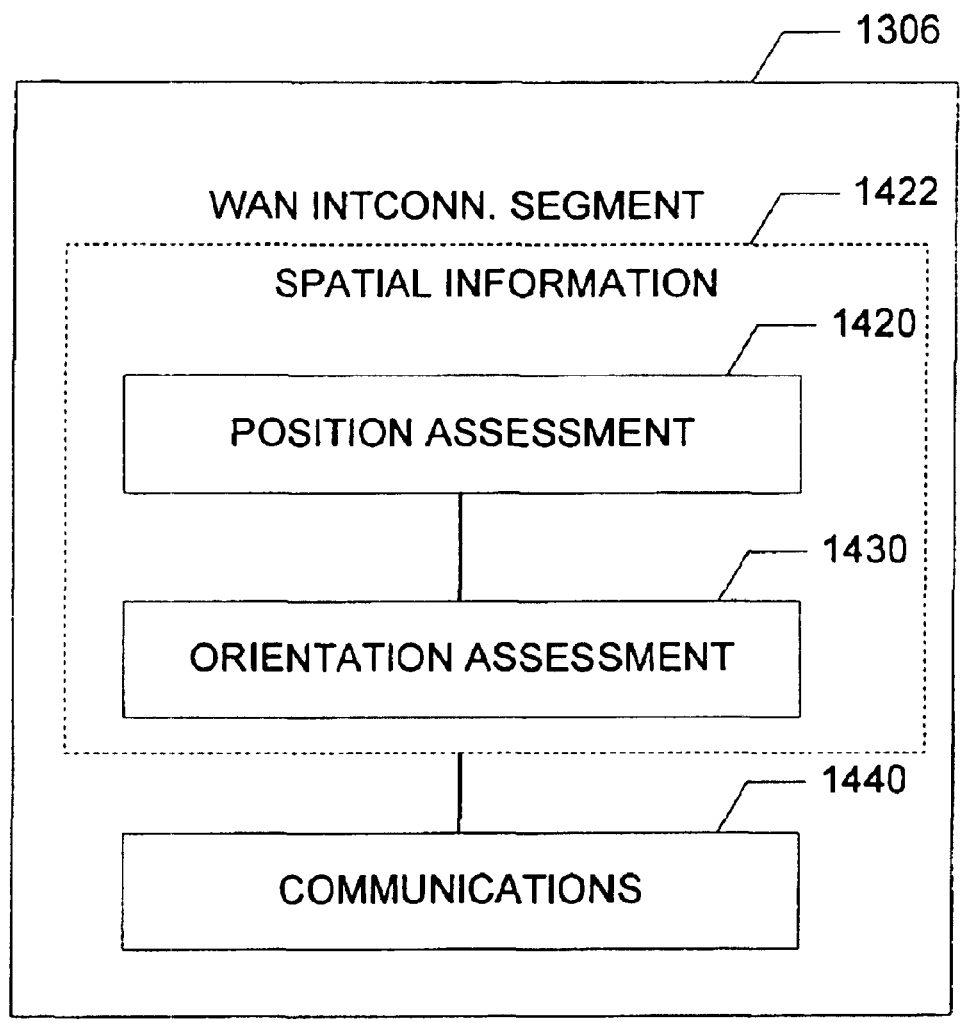
FIG. 14 is a simplified diagram for WAN interconnect segment according to an embodiment of the present invention.

FIG. 14 is a simplified diagram for WAN interconnect segment according to an embodiment of the present invention. This diagram is merely an illustration, which should not unduly limit the scope of the claims. One of ordinary skill in the art would recognize many variations, alternatives, and modifications. The WAN interconnect segment 1306 is part of the WAN router 1302. For example, the WAN router 1302 is anyone of the WAN routers 1302A, 1302B, . . . , 1302M, . . . , 1302N. The WAN interconnect segment 1306 is anyone of the WAN interconnect segment 1306A, 1306B, . . . , 1306M, . . . , and 1306N. As shown in FIG. 14, the WAN interconnect 1306 includes a spatial information system 1422 and a communications system 1440. The spatial information system 1422 includes a position assessment system 1420 and an orientation assessment system 1430. Although the above has been shown using systems 1422, 1420, 1430, and 1440, there can be many alternatives, modifications, and variations. For example, some of the systems may be expanded and/or combined. The position assessment system 1420 and the orientation assessment system 1430 may be combined. Other systems may be inserted to those noted above. Depending upon the embodiment, the specific systems may be replaced. Further details of these systems are found throughout the present specification and more particularly below.

The spatial information system 1422 transmits and receives spatial information for the WAN 1312. Also the system 1422 sends the obtained spatial information to the communications system 1440. More specifically, the position assessment system 1420 receives and transmits position information for the WAN routers. Orientation assessment system 1430 receives and transmits orientation information for the WAN routers. The obtained position and orientation information can help the system communications 1440 orientate its transmitter and receiver. The system communications 1440 in conjunction with the WAN crosslink segment receives and sends communication signals. As discussed above, the WAN router can serve as a base station, a user, or both for the WAN 1312.

The navigation capability as embodied in the position assessment system 1420 and the orientation assessment system 1430 is important for the WAN 1312. For example, the WAN 1312 has the capability to perform high-speed communications over large distance. Such long-distance communications usually require transmitters with significant transmission power. But high-power transmitters are usually heavy. The spacecrafts however usually have limited energy resources and significant weight limitations. To reduce energy consumption and transmitter weight, the base stations in the WAN 1312 usually direct their communication signals to other base stations or user spacecrafts, as opposed to sending out the signals into all directions. The directional transmission usually involves obtaining navigation information and aligning transmitters and receivers. The wireless connection between two WAN routers may take various forms, such as RF connection and optical connection including laser.

Figure 15:
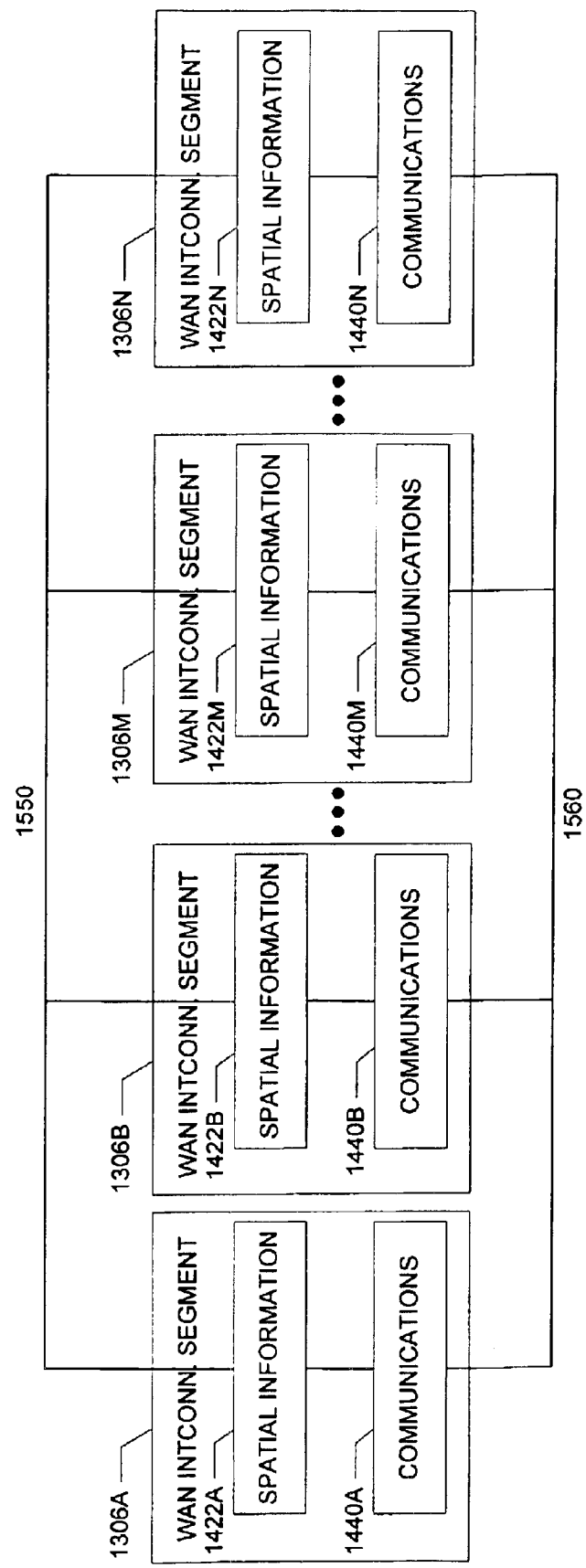
FIG. 15 is a simplified diagram showing network structure of WAN according to an embodiment of the present invention.

FIG. 15 is a simplified diagram showing network structure of WAN according to an embodiment of the present invention. This diagram is merely an illustration, which should not unduly limit the scope of the claims. One of ordinary skill in the art would recognize many variations, alternatives, and modifications. The WAN 1312 includes two wireless network, i.e., a wireless network 1550 for spatial information and a wireless network 1560 for communications. These two wireless networks may operate as a single wireless network or as two separate wireless networks. The wireless network 1550 for spatial information includes at least a communication channel to transmit and receive spatial information between at least two of the WAN routers. As shown in FIG. 15, the wireless network 1550 uses systems 1422A, 1422B, . . . , 1422M, . . . , and 1422N for spatial information. These spatial information systems are substantially similar to the spatial information system 1422 as shown in FIG. 14, and are respectively parts of the WAN interconnect segments 1306A, 1306B, . . . , 1306M, . . . , and 1306N as shown in FIG. 13. These interconnect segments correspond to the WAN routers 1302A, 1302B, . . . , 1302M, . . . , and 1302N respectively. Each of these WAN routers have spatial information indicative of position and orientation of each of the WAN spacecrafts on which the WAN routers reside respectively. The wireless network 1560 for communications uses systems 1440A, 1440B, . . . , 1440M, . . . , and 1440N for communications. These systems for communications are respectively parts of the WAN interconnect segments 1306A, 1306B, . . . , 1306M, . . . , and 1306N as described in FIG. 13. These interconnect segments correspond to the WAN routers 1306A, 1306B, . . . , 1306M, . . . , and 1306N respectively. The communications systems 1440A, 1440B, . . . , 1440M, . . . , and 1440N are substantially similar to the communication systems 1440 as shown in FIG. 14, and they each in conjunction with the respective WAN crosslink segments 1308A, 1308B, . . . , 1308M, . . . , and 1308N have a receiver to receive signals including routing information. The routing information provides at least information for a destination WAN spacecraft as a destination of the signal. For example, the routing information is stored in the headers of information packets. The communications systems 1440A, 1440B, . . . , 1440M, . . . , and 1440N each serve as a routing system to determine a desire route from a group of routes to transmit the signal from the spacecraft receiving the signal to the destination spacecraft based on at least the spatial information of WAN spacecrafts, such as 1394A, 1394B, . . . , 1394M, . . . , and 1394N. Each route includes a group of path spacecrafts comprising the receiving spacecraft and the destination spacecraft or comprising the receiving spacecraft, the destination spacecraft, and at least one of the WAN spacecrafts 1312A, 1312B, . . . , 1312M, . . . , and 1312N.

Additionally, the communications systems 1440A, 1440B, . . . , 1440M, . . . , and 1440N each in conjunction with the respective WAN crosslink segments 1308A, 1308B, . . . , 1308M, . . . , and 1308N provide a transmitter to transmit the signal based upon the desired route and the spatial information of the path spacecrafts of the desired route. The spatial information of the path spacecrafts of the desired route provides for transferring the signal from the receiving spacecraft to the destination spacecraft. For example, the receiving spacecraft, the destination spacecraft and other path spacecrafts are selected from the WAN spacecrafts, such as the WAN spacecrafts 1394A, 1394B, . . . , 1394M, . . . , and 1394N. As another example, the receiving spacecraft is a client spacecraft in a receiving LAN, and the destination spacecraft is a client spacecraft in a destination LAN. The receiving LAN and the destination LAN are two different LANs, each substantially similar to the LAN 812 as shown in FIG. 8. A receiving base station of the receiving LAN and a destination base station of the destination LAN share the same WAN, such as the WAN 1312. In one embodiment, the receiving spacecraft communicates with the receiving base station over the receiving LAN with a desired route selected by a base station of the receiving LAN. The receiving base station communicates with the destination base station over the WAN with a desired route selected by at least a base station of the WAN. The selection of the desired route in the WAN is further described in FIGS. 16 and 17. The destination base station communicates with the destination spacecraft over the destination LAN with a desired route selected by a base station of the destination LAN.

Additionally, the communications systems 1440A, 1440B, . . . , 1440M, . . . , and 1440N receive updated spatial information of the WAN spacecrafts 1394A, 1394B, . . . , 1394M, . . . , and 1394N at a later time step. In response, these communications systems determine a updated desired route based on at least the updated spatial information of the WAN spacecrafts. The updated desired route and the pre-update desired route may be the same route or different routes. The transmitters of the systems 1440A, 1440B, . . . , 1440M, . . . , and 1440N transmit the signal based upon the updated desired route and the updated spatial information of the path spacecrafts of the updated desired route. The updated spatial information of the path spacecrafts provides for transferring the signal from the receiving spacecraft to the destination spacecraft.

Figure 16:
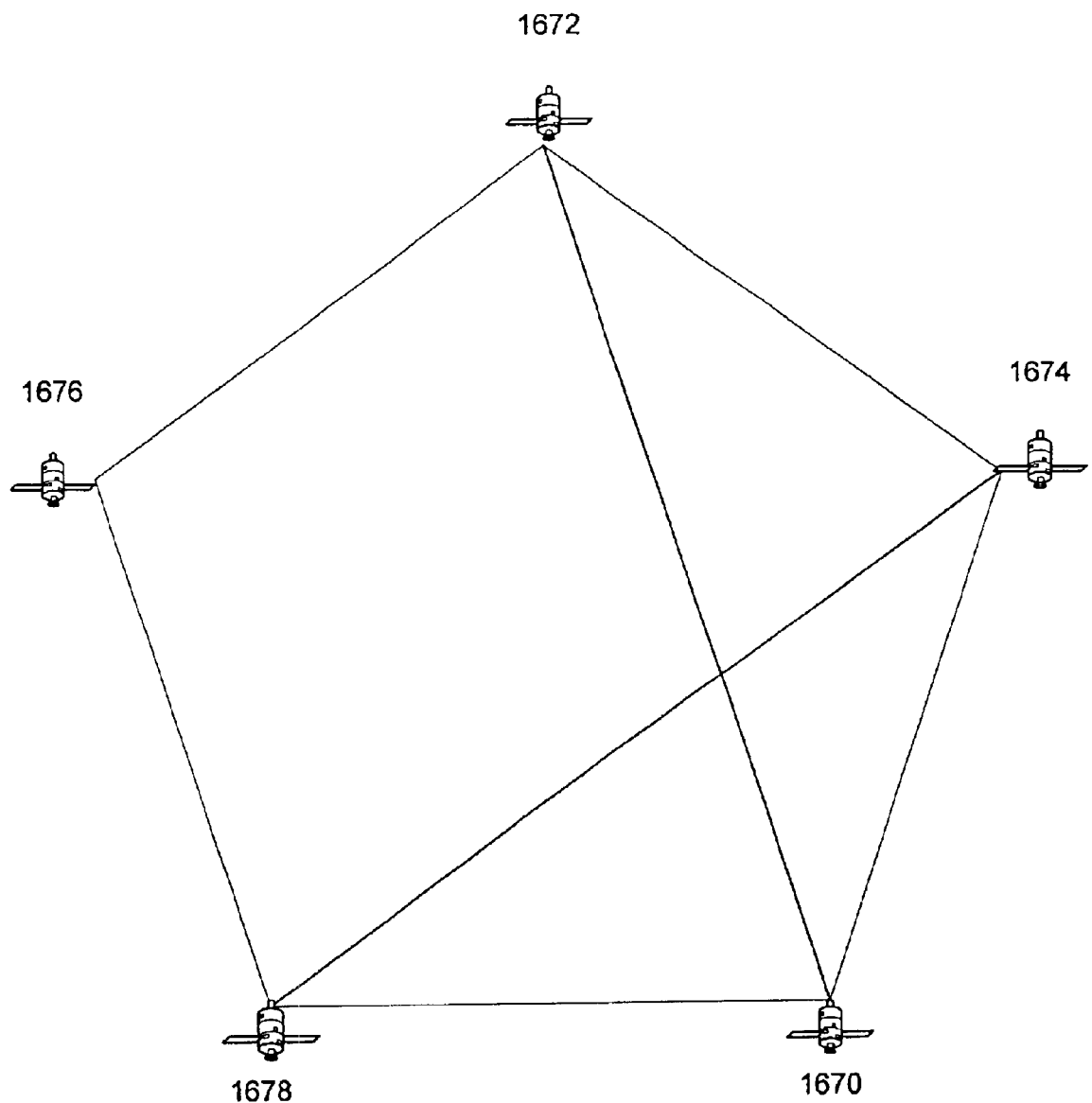
FIG. 16 is a simplified diagram for communication routes according to one embodiment of the present invention.

FIG. 16 is a simplified diagram for communication routes according to one embodiment of the present invention. This diagram is merely an illustration, which should not unduly limit the scope of the claims. One of ordinary skill in the art would recognize many variations, alternatives, and modifications. WAN spacecrafts 1670, 1672, 1674, 1676 and 1678 are examples of the WAN spacecrafts 1394A, 1394B, . . . , 1394M, . . . , and 1394N. For example, the WAN spacecraft 1670 is a receiving spacecraft that receives a signal, and the signal identifies the WAN spacecraft 1672 as its destination spacecraft. From the spacecraft 1670 to the spacecraft 1672, there exist multiple paths corresponding to different groups of path spacecrafts. For example, a route may take a direct path from the spacecraft 1670 to the spacecraft 1672. Alternatively, a route may take an indirect path from the spacecraft 1670 to the spacecraft 1672. For example, the route passes the spacecrafts 1670, 1674, 1678, 1676 and 1672, spacecrafts 1670, 1674, and 1672, spacecrafts 1670, 1678, 1674, and 1672, or any other group of path spacecrafts.

FIG. 17 is a simplified diagram of WAN routing database for communications according to one embodiment of the present invention. This diagram is merely an illustration, which should not unduly limit the scope of the claims. One of ordinary skill in the art would recognize many variations, alternatives, and modifications. The communications systems 1440A, 1440B, . . . , 1440M, . . . , and 1440N each have a routing database 1780. For example, the routing database 1780 for the spacecraft 1670 includes a lists of routes from the spacecraft 1670 to different destinations such as the spacecraft 1672 and other spacecrafts. As illustrated in FIG. 17, various routes correspond to different groups of path spacecrafts. For instance, route 2 starts from the spacecraft 1670, passes through the spacecrafts 1674, 1678, and 1676, and arrives at the spacecraft 1672. Hence the spacecrafts 1670, 1674, 1678, 1676, and 1672 are the path spacecrafts for route 2. Additionally, routing database 1780 also contains route information such as traffic load corresponding to each route and uses such information to select a desired route.

FIG. 18 is a simplified WAN and LAN network according to one embodiment of the present invention. This diagram is merely an illustration, which should not unduly limit the scope of the claims. One of ordinary skill in the art would recognize many variations, alternatives, and modifications. WAN spacecrafts 1810, 1812, 1814, 1816, 1818, and 1820 are examples of the WAN spacecrafts 1394A, 1394B, ..., 1394M, ..., and 1394N. The WAN spacecrafts 1810, 1812, 1814, 1816, 1818, and 1820 are server spacecrafts, and they serves as base stations for the WAN. Spacecrafts 1850 and 1852 are client spacecrafts. For example, the client spacecraft 1852 is in the same LAN as the server spacecraft 1812. The client spacecraft 1850 is in the same LAN as the server spacecraft 1820. But the client spacecrafts 1850 and 1852 do not belong to the same LAN. In one embodiment, the communications between the client spacecrafts 1850 and 1852 are carried out over both the LANs and the WAN. For example, the client spacecraft 1850 transmits a signal directly or indirectly to the server spacecraft 1820 over the LAN. Subsequently, the signal is sent directly or indirectly from the server spacecraft 1820 to the server spacecraft 1812 over the WAN. Afterwards, the signal is transmitted from the server spacecraft 1812 to the client spacecraft 1852 over the another LAN.

In one embodiment of the present invention, the client spacecraft 1850 has an uplink antenna to receive commands from a ground station. The client spacecraft 1852 can image the earth surface and survey the earth weather conditions. As shown in FIG. 18, the ground station can command the client spacecraft 1852 through the client spacecraft 1850, the server spacecraft 1820 and the server spacecraft 1812 over the LANs and the WAN.

As discussed above and further emphasized here, FIG. 18 is only illustrative. One of ordinary skill in the art would recognize many variations, alternatives, and modifications. For example, the client spacecraft 1850 can move with respect to the server spacecrafts 1810, 1812, 1814, 1816, 1818, and 1820. Hence at different times, the client spacecraft 1850 may share a LAN with different server spacecrafts. For example, at one time, the client spacecraft 1850 shares a LAN with the server spacecraft 1820, but at another time, the client spacecraft 1850 shares another LAN with the server spacecraft 1816, not the server spacecraft 1820. Hence communications between the client spacecraft 1850 and the client spacecraft 1852 may rely on different LANs at different times.

The client spacecraft contemplated by the present invention include any type of spacecraft with which communications are desired. Typically, client spacecraft are satellites in Earth orbit, performing terrestrially oriented missions. However, any other type of spacecraft, such as interplanetary space probes, may utilize the present invention. Typical missions include communications missions, such as deep space relay, power relay, eclipse mitigation, real time communication coverage, and messaging, meteorological missions, such as space weather missions and terrestrial weather synoptic coverage, imaging missions, such as long baseline interferometry, navigation missions, such as deep space navigation, ranging, and positioning, and other missions, such as rapid response user services, seismic sensing, space systems assurance monitoring, and global search and rescue locator missions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, ROM, and CD-ROM's, as well as transmission-type media, such as digital and analog communications links.

The present invention has various advantages. Some embodiments of the present invention centralize certain functions onto a server spacecraft and delegate certain functions to specialized client spacecrafts. For example, the client spacecrafts may specialize in uplink communications with a ground station, downlink communications with a ground station, altitude control, or other function. As another example, the server spacecraft may provide power to the client spacecrafts over LAN. The client spacecrafts are usually less expensive than a fully-functional spacecraft without the support of the server spacecraft and other client spacecrafts. The client spacecrafts of the present invention are usually easy to replace and can provide backup to other client or server spacecrafts.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims. For example, a server spacecraft or a client spacecraft may perform all or some functions and includes all or some components as shown in FIGS. 1–18.

What is claimed is:

1. A spacecraft network, the network comprising:
   a first server spacecraft disposed in a first server orbit;
   a first client spacecraft disposed in a first client orbit;
   a wireless local area network formed between at least the first server spacecraft and the first client spacecraft, the wireless local area network comprising:
   at least one communication channel to transmit and receive spatial information between at least the first server spacecraft and the first client spacecraft, the spatial information indicative of at least a first server position and a first server orientation of the first server spacecraft and a first client position and a first client orientation of the first client spacecraft;
   at least one receiver to receive a first communication signal including at least routing information, the routing information including at least a destination spacecraft as a destination of the first communication signal;
   at least one routing system to determine a desired route from a plurality of routes to transmit the first communication signal to the destination spacecraft, each of the plurality of routes corresponding to a plurality of path spacecrafts;
   at least one transmitter to transmit the first communication signal based upon the desired route and the spatial information of the plurality of path spacecrafts of the desired route;
   wherein
   the first client spacecraft is free from the at least one routing system;
   the first server spacecraft includes one of the at least one routing system.

2. The spacecraft network of claim 1 wherein the wireless local network is capable of transmitting and receiving the first communication signal directly between the first server spacecraft and the first client spacecraft, the first server spacecraft and the first client spacecraft having a communication distance equal to or larger than 64 kilometers.

3. The spacecraft network of claim 2 wherein the communication distance is equal to 200 kilometers.

4. The spacecraft network of claim 1 wherein the first server spacecraft receives the first communication signal from the first client spacecraft.

5. The spacecraft network of claim 1 wherein the destination spacecraft is a second client spacecraft, the second client spacecraft being free from the at least one routing system.

6. The spacecraft network of claim 5 wherein the second client spacecraft is the same as the first client spacecraft.

7. The spacecraft network of claim 5 wherein the second client spacecraft is different from the first client spacecraft.

8. The spacecraft network of claim 1 wherein the first communication signal provides data to the destination spacecraft.

9. The spacecraft network of claim 1 wherein the first communication signal provides an energy to the destination spacecraft, the destination spacecraft using the energy as a power source.

10. The spacecraft network of claim 1 wherein the first server spacecraft comprises:
    a first spacecraft platform; and
    a first server system operable to manage the first communication signal in the wireless local area network to or from the first client spacecraft.

11. The spacecraft network of claim 1 wherein the first server spacecraft is operable to manage the first communication signal between the first client spacecraft and a ground terminal.

12. The spacecraft network of claim 11 wherein the first server spacecraft is operable to manage the first communication signal by routing the first communication signal between the first client spacecraft and the ground terminal.

13. The spacecraft network of claim 11 wherein the ground terminal is communicatively connected to a ground-based network.

14. The spacecraft network of claim 13 wherein the ground-based network is the Internet.

15. The spacecraft network of claim 1 wherein the first server spacecraft is operable to route the first communication signal between the first client spacecraft and a second client spacecraft, the second client spacecraft being free from the at least one routing system.

16. The spacecraft network of claim 15 wherein the first client spacecraft and the second spacecraft are of a same type.

17. The spacecraft network of claim 16 wherein the first client spacecraft and the second client spacecraft are operable to perform missions of a same type.

18. The spacecraft network of claim 15 wherein the first client spacecraft and the second spacecraft are of different types.

19. The spacecraft network of claim 18 wherein the first client spacecraft and the second client spacecraft are operable to perform missions of different types.

20. The spacecraft network of claim 1 wherein the first client spacecraft is a part of a remote cluster of client spacecrafts.

21. The spacecraft network of claim 20 wherein the first server spacecraft is operable to manage the first communication signal by routing the first communication signal to or from the first client spacecraft in the remote cluster of client spacecrafts.

22. The spacecraft network of claim 20 wherein the remote cluster of client spacecrafts comprises the first client spacecraft and a second client spacecraft, the first client spacecraft and the second client spacecraft being of a same type.

23. The spacecraft network of claim 22 wherein the first client spacecraft and the second client spacecraft are operable to perform missions of a same type.

24. The spacecraft network of claim 20 wherein the remote cluster of client spacecrafts comprises the first client spacecraft and a second client spacecraft, the first client spacecraft and the second client spacecraft being of different types.

25. A spacecraft network, the network comprising:
    a first server spacecraft disposed in a first server orbit;
    a second server spacecraft disposed in a second server orbit;
    a wireless wide area network formed between at least the first server spacecraft and the second server spacecraft, the wireless wide area network comprising:
        at least one communication channel to transmit and receive spatial information between at least the first server spacecraft and the second server spacecraft, the spatial information indicative of at least a first server position and a first server orientation of the first server spacecraft and a second server position and a second server orientation of the second server spacecraft;
        at least one receiver to receive a first communication signal including at least routing information at the first server spacecraft, the routing information including at least a destination spacecraft as a destination of the first communication signal;
        at least one routing system to determine a desired route from a plurality of routes to transmit the first communication signal from the first server spacecraft to the destination spacecraft, each of the plurality of routes corresponding to a plurality of path spacecrafts;
        at least one transmitter to transmit the first communication signal based upon the desired route and the spatial information of the plurality of path spacecrafts of the desired route;
    wherein
        the first server spacecraft includes one of the at least one routing system.

26. The spacecraft network of claim 25 wherein the wireless wide network is capable of transmitting and receiving the first communication signal directly between the first server spacecraft and the second server spacecraft, the first server spacecraft and the second server spacecraft having a communication distance equal to or larger than 100 kilometers.

27. The spacecraft network of claim 25 wherein the first server spacecraft is a base station of the wireless wide area network and connected to a wireless local area network including at least the first server spacecraft and a first client spacecraft.

28. The spacecraft network of claim 25 wherein the first server spacecraft receives the first communication signal from the second server spacecraft.

29. The spacecraft network of claim 25 wherein the destination spacecraft is the second server spacecraft.

30. The spacecraft network of claim 25 wherein the first communication signal provides data to the destination spacecraft.

31. The spacecraft network of claim 25 wherein the first communication signal provides an energy to the destination spacecraft; the destination spacecraft using the energy as a power source.

32. The spacecraft network of claim 25 wherein the first server spacecraft comprises:

a first spacecraft platform; and a first server system operable to manage the first communication signal in the wireless wide area network to or from the second server client spacecraft.

33. The spacecraft network of claim 25 wherein the first server spacecraft is operable to manage the first communication signal between the second server spacecraft and a ground terminal.

34. The spacecraft network of claim 33 wherein the first server spacecraft is operable to manage the first communication signal by routing the first communication signal between the second server spacecraft and the ground terminal.

35. The spacecraft network of claim 34 wherein the ground terminal is communicatively connected to a ground-based network.

36. The spacecraft network of claim 35 wherein the ground-based network is the Internet.

37. The spacecraft network of claim 25 wherein the first server spacecraft is operable to route the first communications signal between an originating spacecraft and the destination spacecraft, the destination spacecraft being the second server spacecraft.

38. The spacecraft network of claim 37 wherein the originating spacecraft being a client spacecraft.

39. The spacecraft network of claim 37 wherein the originating spacecraft being a third server spacecraft.

40. The spacecraft network of claim 25 wherein the first server spacecraft is operable to route the first communications signal between an originating spacecraft and the destination spacecraft, the destination spacecraft being a client spacecraft.

41. The spacecraft network of claim 40 wherein the originating spacecraft being a client spacecraft.

42. The spacecraft network of claim 40 wherein the originating spacecraft being a third server spacecraft.

43. The spacecraft network of claim 25 wherein the first server spacecraft is operable to manage the first communication signal by routing the first communication signal to or from the second server spacecraft.

44. A method for spacecraft communication, the method comprising:

disposing a first server spacecraft in a first server orbit;

disposing a first client spacecraft in a first client orbit;

transmitting and receiving spatial information between the first server spacecraft and the first client spacecraft, the spatial information indicative of at least a first server position and a first server orientation of the first server spacecraft and a first client position and a first client orientation of the first client spacecraft;

receiving an information packet including at least routing information, the routing information including at least a destination spacecraft as a destination of the information packet;

determining a desired route from a plurality of routes to transmit the information packet data to the destination spacecraft based on at least the spatial information of the destination spacecraft, the plurality of routes corresponding to a plurality of paths respectively, each of the plurality of paths including a plurality of path spacecrafts;

transmitting the information packet based upon the desired route and the spatial information of the plurality of path spacecrafts of the desired route;

wherein the first client spacecraft is free from the at least one routing system;

the first server spacecraft includes one of the at least one routing system.

45. A method for spacecraft communication, the method comprising:

disposing a first server spacecraft in a first server orbit;

disposing a second server spacecraft in a second server orbit;

transmitting and receiving spatial information between the first server spacecraft and the second server spacecraft, the spatial information indicative of at least a first server position and a first server orientation of the first server spacecraft and a second server position and a second server orientation of the second server spacecraft;

receiving an information packet including at least routing information, the routing information including at least a destination spacecraft as a destination of the information packet;

determining a desired route from a plurality of routes to transmit the information packet data to the destination spacecraft based on at least the spatial information of the destination spacecraft, the plurality of routes corresponding to a plurality of paths respectively, each of the plurality of paths including a plurality of path spacecrafts;

transmitting the information packet based upon the desired route and the spatial information of the plurality of path spacecrafts of the desired route;

wherein the first server spacecraft includes one of the at least one routing system.

* * * * *